United States Patent
Komatsu et al.

(10) Patent No.: US 7,120,037 B2
(45) Date of Patent: Oct. 10, 2006

(54) POWER OUTPUTTING DEVICE AND VEHICLE MOUNTING IT, CONTROL METHOD, STORING MEDIUM AND PROGRAM FOR THE POWER OUTPUTTING DEVICE, DRIVE DEVICE AND VEHICLE MOUNTING IT, AND, CONTROL METHOD, STORING MEDIUM AND PROGRAM FOR THE DRIVE DEVICE

(75) Inventors: Masayuki Komatsu, Aichi-ken (JP); Eiji Sato, Toyota (JP); Ryoji Oki, Toyota (JP); Sumikazu Shamoto, Nagoya (JP); Makoto Nakamura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 214 days.

(21) Appl. No.: 10/239,889

(22) PCT Filed: Oct. 4, 2001

(86) PCT No.: PCT/JP01/08751
§ 371 (c)(1),
(2), (4) Date: Sep. 26, 2002

(87) PCT Pub. No.: WO02/065628
PCT Pub. Date: Aug. 22, 2002

(65) Prior Publication Data
US 2003/0057914 A1 Mar. 27, 2003

(30) Foreign Application Priority Data
Jan. 24, 2001 (JP) .................................. 2001-037007

(51) Int. Cl.
*H02M 5/45* (2006.01)

(52) U.S. Cl. .............................. 363/37; 363/98; 713/300
(58) Field of Classification Search .................... 363/98, 363/132, 100, 37, 17; 713/300; 323/283; 318/729, 139; 320/127, 151, 152, 153, 154; 477/3
See application file for complete search history.

(56) References Cited

U.S. PATENT DOCUMENTS

| 4,719,400 A | 1/1988 | Kurakake et al. |
|---|---|---|
| 5,420,777 A | 5/1995 | Muto |

(Continued)

FOREIGN PATENT DOCUMENTS

| DE | 198 23 917 | 12/1998 |
|---|---|---|
| DE | 199 23 277 | 12/1999 |

(Continued)

*Primary Examiner*—Jessica Han
(74) *Attorney, Agent, or Firm*—Kenyon & Kenyon

(57) ABSTRACT

A power plant outputs motive power by driving a motor (22) using electric power from a direct-current power source (32). When the direct-current power source (32) has a low temperature, the direct-current power source is rapidly heated, whereby the performance can fully be demonstrated. In the power plant in which a capacitor (30) is installed so as to connect a positive electrode bus (26) and a negative electrode bus (28) of an inverter circuit (24) and the direct-current power source (32) is also installed so as to connect the negative electrode bus (28) of the inverter circuit (24) and a neutral point of the motor (22), when a power source temperature (Tb) of the direct-current power source (32) detected by a temperature sensor (50) is less than or equal to a threshold temperature (Tblow) at which supply of required electric power to the motor (22) is possible, an electronic control unit (40) sets a voltage between terminals of the capacitor (30) higher than normal and also sets a frequency of a carrier wave lower than normal, and performs switching control of transistors (T1 to T6) Thus, a ripple of a neutral point current which flows into the direct-current power source (32) can be increased, whereby it is possible to promote calorification of the direct current power source (32).

38 Claims, 16 Drawing Sheets

U.S. PATENT DOCUMENTS

| | | |
|---|---|---|
| 5,576,606 A | 11/1996 | Phuoc et al. |
| 5,710,699 A | 1/1998 | King et al. ............... 363/132 |
| 5,960,898 A | 10/1999 | Okada et al. ............. 180/65.8 |
| 6,048,289 A * | 4/2000 | Hattori et al. ............... 477/3 |
| 6,066,928 A | 5/2000 | Kinoshita et al. ........... 318/139 |
| 6,137,704 A | 10/2000 | Ito et al. ................. 363/132 |
| 6,204,627 B1 | 3/2001 | Watanabe et al. |
| 6,329,791 B1 * | 12/2001 | Yokoyama et al. ......... 320/127 |
| 6,333,612 B1 * | 12/2001 | Suzuki et al. ............. 318/139 |
| 6,700,802 B1 * | 3/2004 | Ulinski et al. ............... 363/37 |

FOREIGN PATENT DOCUMENTS

| | | |
|---|---|---|
| EP | 0 483 852 | 5/1992 |
| EP | 0 584 373 | 3/1994 |
| JP | 55-068898 | 5/1980 |
| JP | 01-107621 | 4/1989 |
| JP | 01-110392 | 7/1989 |
| JP | 09-247992 | 9/1997 |
| JP | 10-337047 | 12/1998 |
| JP | 10-337087 | 12/1998 |
| JP | 11-103592 | 4/1999 |
| JP | 11-178114 | 7/1999 |
| JP | 2000-333469 | 11/2000 |
| JP | 2001-298990 | 10/2001 |

* cited by examiner (a)

(b)

POWER OUTPUTTING DEVICE AND VEHICLE MOUNTING IT, CONTROL METHOD, STORING MEDIUM AND PROGRAM FOR THE POWER OUTPUTTING DEVICE, DRIVE DEVICE AND VEHICLE MOUNTING IT, AND, CONTROL METHOD, STORING MEDIUM AND PROGRAM FOR THE DRIVE DEVICE

TECHNICAL FIELD

The present invention relates to a power plant which is capable of outputting motive power by driving an electric motor and a vehicle to mount the power plant, a control method, a storage medium, and a program of the power plant, a drive unit which is capable of driving a load and a vehicle to carry the drive unit, and a control method, a storage medium, and a program of the drive unit.

BACKGROUND ART

Heretofore, a conventional power plant which comprises a capacitor connected with a positive electrode bus and a negative electrode bus of an inverter circuit for supplying three-phase alternating current power to an electric motor and a direct-current power source connected with the positive electrode bus or the negative electrode bus of the inverter circuit and a neutral point of the electric motor has been proposed (for example, Japanese Patent Laid-Open Publication No. Hei 10-337047, Japanese patent Laid-Open Publication No. Hei 11-178114, and the like). In this device, a circuit comprising a coil of each phase of the electric motor and a switching element of each phase of the inverter circuit is caused to function as a booster chopper circuit for accumulating electric charge in the capacitor by increasing a voltage of the direct-current power source, and the electric motor is driven assuming that the capacitor in which electric charge is accumulated can be considered to be a direct-current power source. Switching operation of the switching elements of the inverter circuit which is executed at the time of applying the three-phase alternating current to the electric motor causes simultaneous control of driving of the electric motor and control of the accumulation of electric charges in the capacitor.

However, in such a power plant, there are situations where the electric motor cannot be driven with a desired output because, although the power plant can operate at full performance when the direct-current power source has a normal temperature, when the temperature of the direct-current power source is low, such as at a start-up time of the electric motor, the rate of chemical reaction inside the direct-current power source slow down then internal resistance of the direct-current power source increases. Under such conditions, therefore, the performance of a battery is sometimes less than optimal.

Further, because an output of the direct-current power source decreases even when the direct-current power source has a high temperature, it is preferable to maintain the temperature of the direct-current power source within an appropriate range in order for the power plant to perform at its maximum potential. Still further, in order to carry out stable boosting operation of a power conversion section which functions as the booster chopper circuit in the power plant described above, it is preferable to maintain the temperature of that section within an appropriate range.

Such circumstances are similarly applicable to the temperature of a direct-current power source and a temperature of a DC—DC converter in a device in which boosting operation of a circuit comprising a coil of each phase of an electric motor and switching elements of an inverter circuit is executed by the DC—DC converter as a substitute, namely a power plant in which DC—DC conversion of a direct-current voltage coming from the direct-current power source flows into the DC—DC converter, direct-current power is accumulated in a capacitor, the direct current power accumulated in the capacitor is converted into three-phase alternating-current power by switching operation of the switching elements of the inverter circuit, and the three-phase alternating-current power is supplied to the electric motor. The situation is comparable for temperatures in a drive unit in which DC—DC conversion of a direct-current voltage from the direct-current power source is performed by a DC—DC converter, direct current power is accumulated in a capacitor, and the directcurrent power accumulated in the capacitor is supplied to an electrical appliance (a load).

An object of the power plant and the control method according to the present invention is to solve such problems and to maximize performance of the power plant by maintaining appropriate temperatures for the power source or the power conversion section. Further, the power plant according to the present invention is directed to rapidly heating up the power source which has a low temperature so to enable maximum performance of the power plant. Further, the power plant according to the present invention is directed to restraining the power conversion section from increasing the temperature so as to maximize the performance of the power plant. Further, the present invention is directed to providing a vehicle capable of maintaining a more appropriate temperature in the power plant so as to improve performance of the power plant. The storage medium and the program according to the present invention are directed to causing a computer to function as a control device for maintaining more appropriate temperature conditions for the power source or the power conversion section.

Further, the drive unit according to the present invention is directed to maximizing performance by maintaining more appropriate temperature conditions for the power source or the DC—DC converter. Further, the drive unit according to the present invention is directed to maximizing performance by rapidly heating up the power source when the temperature of the power source is low. Further, the drive unit according to the present invention is directed to maximizing performance by restraining the temperature of the DC—DC converter. Further, the present invention is directed to providing a vehicle which maintains a more appropriate temperature in the drive unit so as to maximize the performance of the drive unit. The storage medium and the program according to the present invention are directed to causing a computer to function as a control device for maintaining more appropriate temperatures for the power source or the DC—DC converter.

DISCLOSURE OF THE INVENTION

A first power plant according to the present invention comprises: an electric motor which operates by a polyphase current;

an inverter circuit which is capable of supplying polyphase electric power to the electric motor by switching a plurality of switching elements;

a first power source connected with a positive electrode bus and a negative electrode bus of the inverter circuit;

a second power source connected with either bus of the positive electrode bus and the negative electrode bus of the inverter circuit and a neutral point of the electric motor; and temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

In the first power plant according to the present invention, because the temperature control means perform switching control of the switching elements of the inverter circuit so as to perform temperature control based on a temperature of the power conversion section or a temperature of the second power source, the temperature of the power conversion section or the temperature of the second power source can be maintained in more appropriate conditions with simple constitution, whereby it is possible to cause the power plant to maximizing performance. Here, the "first power source" and the "second power source" also include power sources which can charge and discharge, and the "electric motor" also includes electric motors which function as generator motors capable of generating electricity. Further, it is preferable that the "second power source" has a capacity larger than that of the "first power source." Hereinafter, the "first power source," the "second power source," and the "electric motor" include the above unless otherwise described.

A second power plant according to the present invention comprises:

an electric motor which operates by a polyphase current;

an inverter circuit which is capable of supplying polyphase electric power to the electric motor by switching a plurality of switching elements;

a first power source connected with either bus of a positive electrode bus and a negative electrode bus of the inverter circuit and a neutral point of the electric motor;

a second power source connected with the other bus of the inverter circuit, which is different from the either bus, and the neutral point of the electric motor; and temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

The second power plant according to the present invention can have results similar to those of the first power plant described above.

In the first power plant or the second power plant according to the present invention, it can also be arranged such that the first power source is an electric strage device which can be charged with power from the second power source and the temperature control means are means for controlling a charged voltage of the electric storage device by the switching control described above based on a temperature of the power conversion section or a temperature of the second power source. In the first power plant or the second power plant in such an aspect of the present invention, the temperature control means may be means for performing switching control so as to make the charged voltage of the electric storage device higher than normal when a temperature of the second power source is a first threshold or below, and the temperature control means may also be means for performing the switching control so as to make the charged voltage of the electric storage device lower than normal when a temperature of the second power source is a second threshold or above. Further, in the first power plant or the second power plant in such an aspect of the present invention that the electric storage device is provided, the temperature control means may be means for imposing restrictions on the charged voltage of the electric storage device and performing the switching control when a temperature of the power conversion section is a third threshold or above. Thus, by controlling the charged voltage of the electric storage device based on a temperature of the power conversion section or a temperature of the second power source, it is possible to maintain a more appropriate temperature of the power conversion section or the second power source.

Further, in the first power plant or the second power plant according to the present invention, the temperature control means may be means for setting a switching frequency of the switching elements of the inverter circuit based on a temperature of the power conversion section and a temperature of the second power source and performing switching control at the set switching frequency. In the first power plant or the second power plant in such an aspect of the present invention, the temperature control means may be means for setting the switching frequency of the switching elements of the inverter circuit lower than normal and performing switching control when a temperature of the second power source is at or below a fourth threshold temperature, and the temperature control means may be means for setting the switching frequency of the switching elements of the inverter circuit higher than normal and performing switching control when a temperature of the second power source is at or above a fifth threshold temperature. Further, in the first power plant or the second power plant in such an aspect of the present invention that the switching frequency of the switching elements of the inverter circuit are set, the temperature control means may be means for setting the switching frequency of the switching elements of the inverter circuit higher than normal and performing switching control when temperatures of the coils of the electric motor which are included in the power conversion section are at or exceed a sixth threshold temperature, and the temperature control means may be means for setting the switching frequency of the switching elements of the inverter circuit lower than normal and performing switching control when the temperatures of the switching elements which are included in the power conversion section are a seventh threshold temperature or greater. As described above, by changing the setting of the switching frequency of the switching elements of the inverter circuit based on a temperature of the power conversion section and a temperature of the second power source, it is possible to maintain more appropriate temperatures of the power conversion section or the second power source.

A third power plant according to the present invention comprises:

an electric motor which operates by a polyphase current;

an inverter circuit which is capable of supplying polyphase electric power to the electric motor by switching a plurality of switching elements;

a first power source connected with a positive electrode bus and a negative electrode bus of the inverter circuit;

a second power source connected with either bus of the positive electrode bus and the negative electrode bus of the inverter circuit and a neutral point of the electric motor; temperature detecting means for detecting a temperature of the second power source; and temperature raising means for heating the second power source when the temperature of the second power source detected is a prescribed threshold or below.

In the third power plant according to the present invention, because a second power source which has a low temperature can rapidly be heated by the temperature raising means, the power plant can perform to its full capacity.

A fourth power plant according to the present invention comprises:

an electric motor which operates by a polyphase current;
an inverter circuit which is capable of supplying polyphase electric power to the electric motor by switching a plurality of switching elements;
a first power source connected with either bus of a positive electrode bus and a negative electrode bus of the inverter circuit and a neutral point of the electric motor;
a second power source connected with the other bus of the inverter circuit, which is different from the either bus, and the neutral point of the electric motor;
temperature detecting means for detecting a temperature of the second power source; and
temperature raising means for heating the second power source when the temperature of the second power source detected is a prescribed threshold or below.

The fourth power plant according to the present invention can have results similar to those of the third power plant described above.

A first vehicle according to the present invention carries the first, second, third, and fourth power plants in the aspects of the present invention described above. Thus, the temperatures inside the devices can be maintained more appropriately, and a vehicle which fully demonstrates the performance can be provided.

A control method of the first power plant according to the present invention is a control method of a power plant comprising:

an electric motor which operates by a polyphase current;
an inverter circuit which is capable of supplying polyphase electric power to the electric motor by switching a plurality of switching elements;
a first power source connected with a positive electrode bus and a negative electrode bus of the inverter circuit; and
a second power source connected with either bus of the positive electrode bus and the negative electrode bus of the inverter circuit and a neutral point of the electric motor, and, based on a temperature of the second power source or a temperature of a power conversion section which includes coils of the electric motor and the switching elements and is capable of converting power from the second power source and supply the power to the first power source, switching control of the switching elements of the inverter circuit is carried out so as to control the temperature.

Because in the control method of the first power plant according to the present invention switching control of the switching elements of the inverter circuit is performed so as to carry out temperature control based on a temperature of the power conversion section or a temperature of the second power source, a more appropriate temperature can be maintained in the power conversion section and the second power source with simple constitution. Then, a power plant can still perform to its full capacity.

A control method of the second power plant according to the present invention is a control method of a power plant comprising:

an electric motor which operates by a polyphase current;
an inverter circuit which is capable of supplying polyphase electric power to the electric motor by switching a plurality of switching elements;
a first power source connected with either bus of a positive electrode bus and a negative electrode bus of the inverter circuit and a neutral point of the electric motor; and
a second power source connected with the other bus of the inverter circuit, which is different from the either bus, and the neutral point of the electric motor, and, based on a temperature of the second power source or a temperature of a power conversion section which includes coils of the electric motor and the switching elements and is capable of converting power from the second power source and supply the power to the first power source, switching control of the switching elements of the inverter circuit is carried out so as to control the temperature.

The control method of the second power plant according to the present invention can have results similar to those of the first power plant described above.

In the control method of the first power plant or the second power plant according to the present invention, it is possible to control a charged voltage of the first power source which serves as an electric storage device which can be charged with power from the second power source, using switching control based on a temperature of the second power source or a temperature of the power conversion section. By thus controlling the charged voltage of the electric storage device, it is possible to more appropriately maintain the temperature of the power conversion section or the temperature of the second power source.

Further, in the control method of the first power plant or the second power plant according to the present invention, it is possible to set a switching frequency of the switching elements of the inverter circuit based on a temperature of the power conversion section or a temperature of the second power source and carry out switching control at the set switching frequency. By thus changing the setting of the switching frequency of the switching elements of the inverter circuit, it is possible to maintain more appropriately the temperature of the power conversion section or the temperature of the second power source.

A first storage medium according to the present invention stores, in a power plant comprising:

an electric motor which operates by a polyphase current;
an inverter circuit which is capable of supplying polyphase electric power to the electric motor by switching a plurality of switching elements;
a first power source connected with a positive electrode bus and a negative electrode bus of the inverter circuit; and
a second power source connected with either bus of the positive electrode bus and the negative electrode bus of the inverter circuit and a neutral point of the electric motor, a computer readable program which causes a computer to function as temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

In the first storage medium according to the present invention, because the storage medium stores the computer readable program which causes the computer to function as the temperature control means for performing switching control of the switching elements of the inverter circuit so as to carry out temperature control based on a temperature of the power conversion section or a temperature of the second power source, when the computer is incorporated in the power plant and the power plant is caused to operate, the temperature of the power conversion section or the temperature of the second power source can be more appropriately maintained with simple constitution, whereby it is possible for a power plant to operate to its full potential.

A second storage medium according to the present invention stores, in a power plant comprising:
  an electric motor which operates by a polyphase current;
  an inverter circuit which is capable of supplying polyphase electric power to the electric motor by switching a plurality of switching elements;
  a first power source connected with either bus of a positive electrode bus and a negative electrode bus of the inverter circuit and a neutral point of the electric motor; and
  a second power source connected with the other bus of the inverter circuit, which is different from the either bus, and the neutral point of the electric motor,
a computer readable program which causes a computer to function as temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

The second storage medium according to the present invention can have results similar to those of the first storage medium described above.

A first program according to the present invention is, in a power plant comprising:
  an electric motor which operates by a polyphase current;
  an inverter circuit which is capable of supplying polyphase electric power to the electric motor by switching a plurality of switching elements;
  a first power source connected with a positive electrode bus and a negative electrode bus of the inverter circuit; and
  a second power source connected with either bus of the positive electrode bus and the negative electrode bus of the inverter circuit and a neutral point of the electric motor,
a computer readable program which causes a computer to function as temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

In the first program according to the present invention, since the first program causes the computer to function as the temperature control means for performing switching control of the switching elements of the inverter circuit so as to carry out temperature control based on a temperature of the power conversion section or a temperature of the second power source, when the computer is incorporated in the power plant and the power plant is caused to operate, the temperature of the power conversion section or the temperature of the second power source can be more appropriately maintained with simple constitution, whereby it is possible for power plant tooperate to its full potetial.

A second program according to the present invention is, in a power plant comprising:
  an electric motor which operates by a polyphase current;
  an inverter circuit which is capable of supplying polyphase electric power to the electric motor by switching a plurality of switching elements;
  a first power source connected with either bus of a positive electrode bus and a negative electrode bus of the inverter circuit and a neutral point of the electric motor; and
  a second power source connected with the other bus of the inverter circuit, which is different from the either bus, and the neutral point of the electric motor,
a computer readable program which causes a computer to function as temperature control means for performing, based on a temperature of the second power source or a temperature of a power conversion section which includes coils of the electric motor and the switching elements and is capable of converting power from the second power source and supply the power to the first power source, switching control of the switching elements of the inverter circuit so as to control the temperature.

The second program according to the present invention can have results similar to the first program described above.

A drive unit according to the present invention comprises:
  a DC—DC converter which has energy accumulating means capable of temporarily accumulating a DC current as energy and is capable of performing, by switching switching elements, DC—DC conversion of a direct-current voltage inputted by utilizing the energy accumulated in the energy accumulating means and providing a load with the direct-current voltage converted;
  a power source capable of supplying DC power to the DC—DC converter; and
  temperature control means for performing, based on a temperature of the power source or a temperature of the DC—DC converter, switching control of the switching element so as to control the temperature.

In the drive unit according to the present invention, because the temperature control means carry out, based on a temperature of the power source or a temperature of the DC—DC converter, switching control of the switching elements so as to control the temperature of the corresponding member, the temperature of the power source or the temperature of the DC—DC converter can be more appropriately maintained such that full performance potential can be realized, even in a device with simple constitution. Here, the "power source" includes a power source which can charge and discharge. Hereinafter, the "power source" includes the above unless otherwise described.

In such a drive unit according to the present invention, it can be arranged such that an electric storage device which can be charged with power outputted from the DC—DC converter will be provided and the temperature control means will be means for controlling a charged voltage of the electric storage device by switching control based on a temperature of the power source or a temperature of the DC—DC converter. In the first drive unit in such an aspect of the present invention, the temperature control means may be means for performing switching control so as to make a charged voltage of the electric storage device higher than normal when a temperature of the power source is a first threshold or below, and the temperature control means may also be means for performing the switching control so as to make a charged voltage of the electric storage device lower than normal when a temperature of the power source is a second threshold or above. Further, in the drive unit in such an aspect of the present invention that the electric storage device is provided, the temperature control means may be means for imposing restrictions on the charged voltage of the electric storage device and performing the switching control when a temperature of the DC—DC converter is a third threshold or above. By thus controlling the charged voltage of the electric storage device, it is possible to maintain a more appropriate temperature for the power source or the DC—DC converter.

Further, in the drive unit according to the present invention, the temperature control means may be means for setting a switching frequency of the switching elements based on a temperature of the power source or a temperature of the DC—DC converter and performing switching control with the switching frequency set. In the drive unit in such an aspect of the present invention, the temperature control means may be means for setting the switching frequency lower than normal and performing switching control when a temperature of the power source is a fourth threshold or below, and the temperature control means may also be means for setting the switching frequency higher than normal and performing switching control when a temperature of the power source is a fifth threshold or above. Further, in the drive unit in an aspect of the present invention that the switching frequency of the switching elements of the DC—DC converter is set, the temperature control means may be means for setting the switching frequency lower than normal and performing switching control when temperatures of the switching elements are a sixth threshold or above, and the temperature control means may also be means for setting the switching frequency of the switching elements higher than normal and performing switching control when a temperature of the energy accumulating means is a seventh threshold or above. As described above, by controlling the setting of the switching frequency of the switching elements of the DC—DC converter, it is possible to maintain more appropriate temperatures in the power source or the DC—DC converter.

Further, the drive unit according to the present invention can be configured such that the load described above is an electric motor driven by polyphase current and comprises an inverter circuit which is capable of converting into polyphase electric power direct current power converted by the DC—DC converter and supplying the polyphase electric power to the electric motor.

A vehicle according to the present invention may comprise a drive unit and an electric motor such that the load is the electric motor driven by polyphase current. Thus, the temperature inside the device can be maintained more appropriately making it possible to provide a vehicle which fully demonstrates its performance potential.

The control method of the drive unit according to the present invention is a method of a drive unit comprising:
  a DC—DC converter which has energy accumulating means capable of temporarily accumulating a DC current as energy and is capable of performing, by switching switching elements, DC—DC conversion of a direct-current voltage inputted by utilizing the energy accumulating means and supplying the direct-current voltage to a load; and
  a power source which is capable of supplying direct electric power to the DC—DC converter,
and, based on a temperature of the power source or a temperature of the DC—DC converter, switching control of the switching elements is carried out so as to control the temperature.

In the control method of the drive unit according to the present invention, because switching control of the switching elements is carried out based on a temperature of the power source or a temperature of the DC—DC converter, so as to control the temperature of the corresponding member, it is possible to more appropriately maintain the temperature of the power source or of the DC—DC converter such that a device with simple constitution can enable the drive unit to perform to its full potential.

Such a control method of the drive unit according to the present invention can be characterized such that, based on a temperature of the power source or temperatures of the switching elements, a charged voltage of an electric storage voltage which is included in the drive unit and is capable of storing power outputted from the DC—DC converter is controlled by switching control. As described above, by controlling the charged voltage of the electric storage voltage, it is possible to maintain more appropriate conditions for the temperature of the power source or the temperature of the DC—DC converter.

Further, a control method of the drive unit according to the present invention can be characterized in that, based on a temperature of the power source or a temperature of the DC—DC converter, a switching frequency of the switching elements is set and switching control is carried out at the switching frequency set. As described above, by controlling the setting of the switching frequency of the switching elements of the DC—DC converter, it is possible to maintain more appropriate conditions for the temperature of the power source or the temperature of the DC—DC converter.

A third storage medium according to the present invention stores, in a drive unit comprising:
  a DC—DC converter which has energy accumulating means capable of temporarily accumulating a DC current as energy and is capable of performing, by switching switching elements, DC—DC conversion of a direct-current voltage inputted by utilizing the energy accumulated in the energy accumulating means and providing a load with the direct-current voltage converted; and
  a power source which is capable of supplying direct electric power to the DC—DC converter,
a computer readable program which causes a computer to function as temperature control means for performing, based on a temperature of the direct-current power source or a temperature of the DC—DC converter, switching control of the switching elements so as to control the temperature.

In the third storage medium according to the present invention, because the storage medium stores the computer readable program which causes the computer to function as the temperature control means for performing switching control of the switching elements of the inverter circuit so as to carry out temperature control based on a temperature of the power source or a temperature of the DC—DC converter, when the computer is incorporated in the drive unit and the drive unit is caused to operate, an appropriate temperature can be maintained in the power source or the DC—DC converter, such that it is possible for a drive unit of simple configuration to operate to is full potential.

A third program according to the present invention is, in a drive unit comprising:
  a DC—DC converter which has energy accumulating means capable of temporarily accumulating a DC current as energy and is capable of performing, by switching switching elements, DC—DC conversion of a direct-current voltage inputted by utilizing the energy accumulated in the energy accumulating means and providing a load with the direct-current voltage converted; and a power source which is capable of supplying direct current power to the DC—DC converter, a computer readable program which causes a computer to function as temperature control means for performing, based on a temperature of the direct-current power source or a temperature of the DC—DC converter, switching control of the switching elements so as to control the temperature.

The third program according to the present invention causes the computer to function as the temperature control means for performing switching control of the switching elements of the inverter circuit so as to perform temperature control based on a temperature of the power source or a temperature of the DC converter, and therefore, when the computer is incorporated in the drive unit and the drive unit is caused to operate, an appropriate temperature can be maintained in the power source or the DC—DC converter, such that it is possible for the drive unit to perform to is full potential.

BEST MODE FOR CARRYING OUT THE INVENTION

The present invention will be described in more detail in the following with reference to the accompanying drawings.

FIRST EMBODIMENT

Figure 1:
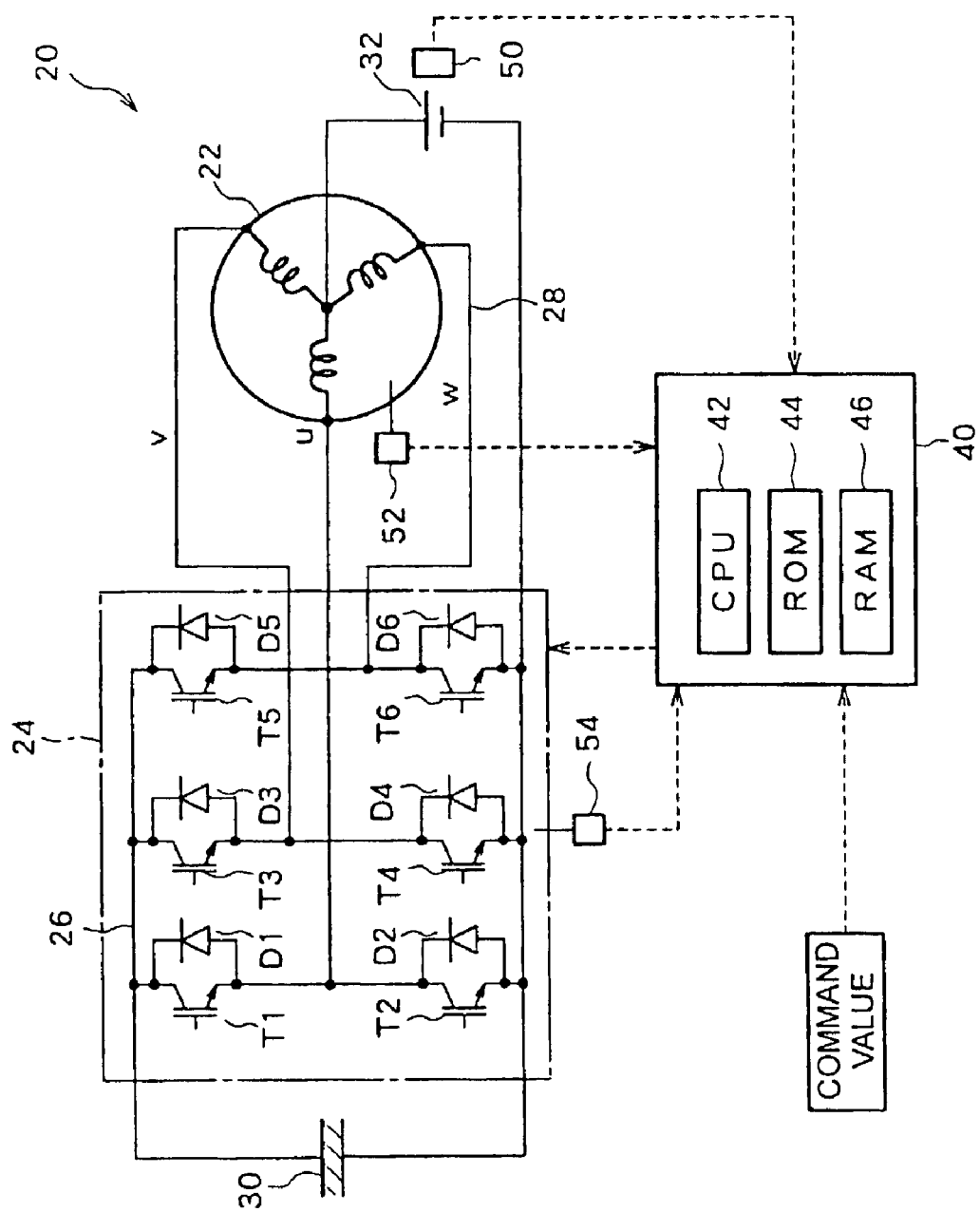
FIG. 1 is a block diagram showing an outline of constitution of a power plant 20 according to a first embodiment of the present invention.

FIG. 1 is a block diagram showing an outline of outlining the constitution of a power plant 20 according to a first embodiment of the present invention. The power plant 20 according to the first embodiment comprises a motor 22 which operates by a three-phase alternating current; an inverter circuit 24 capable of converting direct electric power into three-phase alternating current power and supplying the power converted to the motor 22; a capacitor 30 which is connected with a positive electrode bus 26 and a negative electrode bus 28 of the inverter circuit 24; a direct-current power source 32 which is connected with a neutral point of the motor 22 and the negative electrode bus 28 of the inverter circuit 24; a temperature capacitor 50 for detecting a temperature of the direct-current power source 32; and an electronic control unit 40 which controls the whole device.

The motor 22 is, for example, a synchronous generator motor capable of generating electricity and comprising a rotor to the external surface of which is affixed a permanent magnet and a stator to which three-phase coils are wound. A rotation axis of the motor 22 is an output axis of the power plant according to the first embodiment and power is output from the output axis. Further, because the example motor 22 according to the first embodiment is a generator motor, the motor 22 can generate electricity when power is input to its rotation axis. Additionally, when the power plant 20 according to the first embodiment is installed in a vehicle, the rotation axis of the motor 22 is directly or indirectly connected with a wheel axle.

The inverter circuit 24 comprises six transistors T1 to T6 and six diodes D1 to D6. The six transistors T1 to T6 are arranged in pairs so that these transistors will be a source side and a sink side toward the positive electrode bus 26 and the negative electrode bus 28, respectively, and each of the three-phase coils (u v w) of the motor 22 is connected with each node of the transistors.

The capacitor 30 is constituted to function as a direct-current power source for driving the motor 22. The function of the capacitor 30 will be described in detail below. Further, the direct-current power source 32 is, for example, a secondary battery of nickel metal hydride type or lithium ion type. The direct-current power source 32 has, for example, an accumulation capacity larger than the capacity of the capacitor 30 at an identical voltage.

An electronic control unit 40 is a microprocessor with a CPU 42 as the main component and comprises a ROM 44 which stores a processing program, a RAM 46 which temporarily stores data, and input/output ports (not shown in the drawings). In the electronic control unit 40, command values and the like concerning a power source temperature Tb from a temperature sensor 50 for detecting a temperature of the direct-current power source 32 and the operation of the motor 22 are input via the input port. From the electronic control unit 40, a control signal or the like to be used for carrying out switching control of the transistors T1 to T6 of the inverter circuit 24 is output via the output port.

Operation of the power plant 20 according to the first embodiment as described above will next be described. First, an example operation wherein the capacitor 30 functions as a direct-current power source for supplying electricity to the motor 22 will be described.

Figure 2:
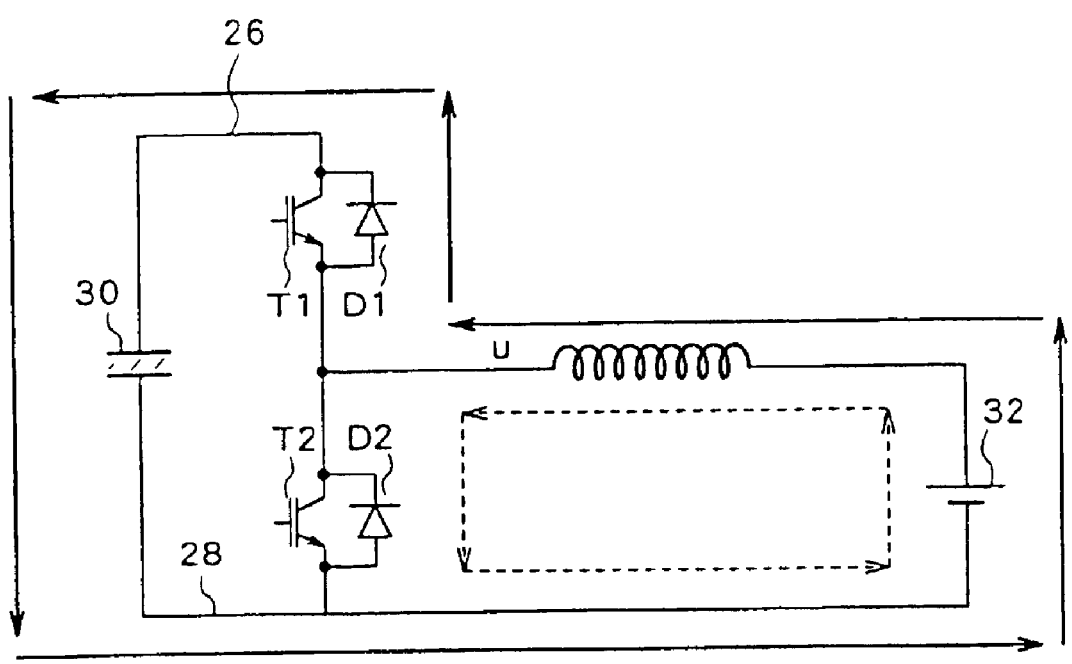
FIG. 2 is a circuit diagram of the power plant 20, and the diagram shows a u phase of three-phase coils of a motor 22.

FIG. 2 is a circuit diagram of the power plant 20. The diagram shows the u phase of the three-phase coils of the motor 22. Considering a state that the transistor T2 of the u phase of the inverter circuit 24 is on, a short circuit as shown by the dotted arrow in the drawing is formed and the u phase of the three-phase coils of the motor 22 functions as a reactor. If the transistor T2 is turned off in this state, energy accumulated in the u phase of the three-phase coils which functions as a reactor will be accumulated in the capacitor 30 via the circuit shown by the solid arrow in the drawing. A voltage at this time may be higher than a voltage of the direct-current power source 32. On the other hand, it is possible to charge the direct-current power source 32 via the circuit using an electric potential of the capacitor 30. Therefore, this circuit can be considered to be a step-up and step-down chopper circuit which is capable of boosting energy of the direct-current power source 32 for accumulation of the energy in the capacitor 30 and also charging the direct-current power source 32 using an electric potential of the capacitor 30. The v and w phases of the three-phase coils of the motor 22 can also be considered to be a step-up and step-down chopper circuits similar to the u phase. Thus, it is possible to charge the capacitor 30 by turning on or off the transistors T2, T4, and T6 or charge the direct-current power source 32 using electric potential storaged in the capacitor 30. The potential difference resulting from charging the capacitor 30 varies according to the quantity of electric charge to be storaged in the capacitor 30, in other words, values of electric currents to be sent to the reactor. Thus, it is possible to control a voltage between terminals of the capacitor 30 by switching control of the transistors T2, T4, and T6 of the inverter circuit 24 and controlling the currents to be sent to the reactor. In order to drive the motor 22 through such a circuit, it is only necessary to provide a pseudo three-phase alternating current to the three-phase coils of the motor 22 by controlling switching of the transistors T1 to T6 of the inverter circuit 24. If direct current components are added to the three-phase alternating current at this time, in other words, an electric potential of the three-phase alternating current is offset to the plus side or the minus side and the three-phase alternating current is supplied to the motor 22, it will be possible to drive the motor 22 using alternating current components while charging the capacitor 30 using the direct current components. Therefore, by performing switching control of the transistors T1 to T6 of the inverter circuit 24, it is possible to drive the motor 22 while controlling a voltage between the terminals of the capacitor 30. The voltage between the terminals of the capacitor 30 is adjusted, for example, so as to be approximately twice as large as the voltage between terminals of the direct-current power source 32.

Figure 3:
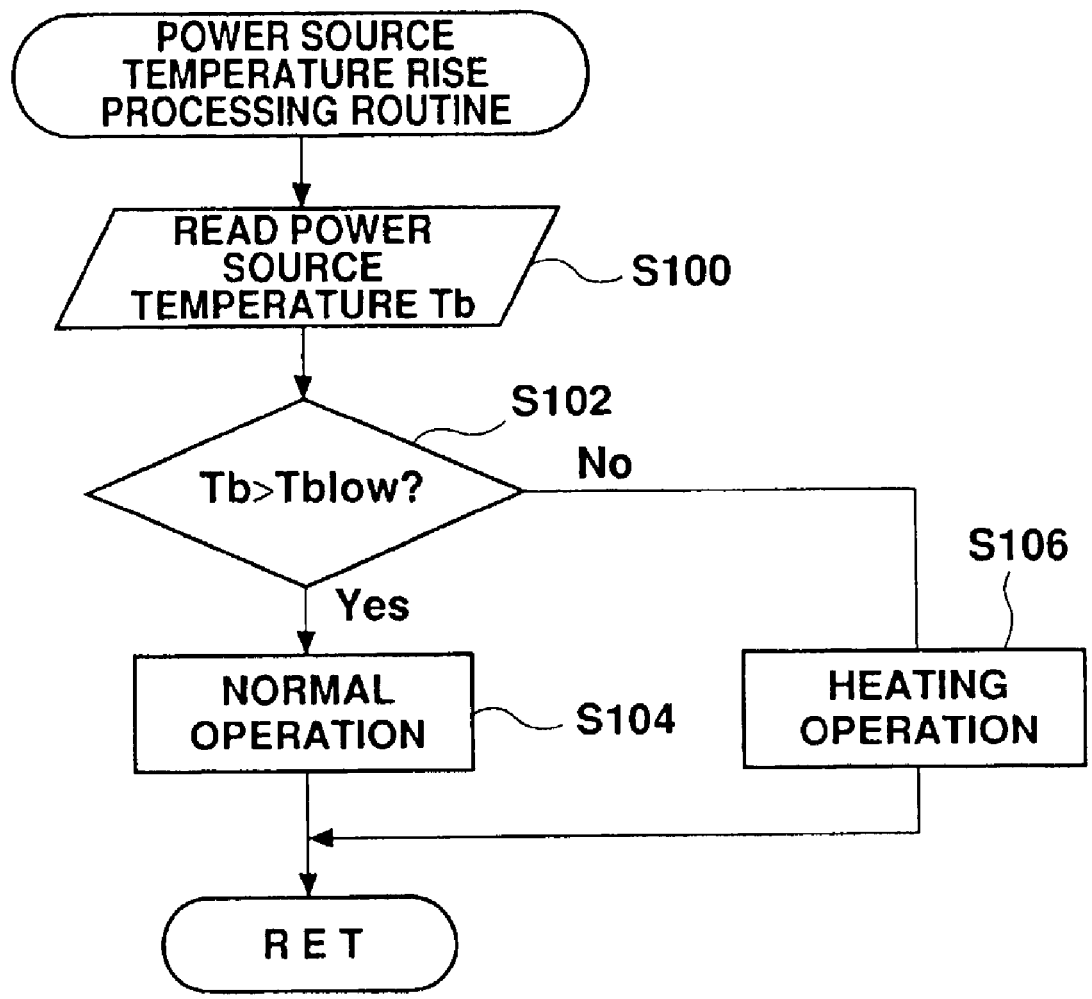
FIG. 3 is a flowchart exemplifying a power source temperature rise processing routine to be executed by an electronic control unit 40 of the power plant 20.

Next, operation of heating the direct-current power source 32 when the direct-current power source 32 is in a low temperature state will be described. FIG. 3 is a flowchart exemplifying a power source temperature rise processing routine to be executed by the electronic control unit 40 of the power plant 20. This routine is executed at each prescribed time.

When the power source temperature rise processing routine is executed, the CPU 42 of the electronic control unit 40 first reads a power source temperature Tb of the direct-current power source 32 coming from the temperature sensor 50 (Step S100) and determines whether or not the power source temperature Tb read out exceeds a prescribed threshold Tblow (Step S102). Here, the threshold Tblow is a threshold to be used for determining whether or not the direct-current power source 32 can output a rated output or power which is required for driving the motor 22, and the threshold is determined based on specifications of a power source or the like. Whether or not necessary power or the like can be output based on the power source temperature Tb is first determined because internal resistance increases when the power source temperature Tb of the direct-current power source 32 becomes low, such that the power available for output to the motor 22 declines. When it is determined that the power source temperature Tb exceeds the threshold Tblow as a result, normal drive control (normal operation) of the motor 22 is carried out determining that necessary power can be supplied to the motor 22 (Step S104). More specifically, a torque command value is set based on a request received from the motor 22, and, based on the setting, switching control of the transistors T1 to T6 of the inverter circuit 24 is carried out so as to drive the motor 22. A switching frequency of the transistors T1 to T6 at this time, in other words, a frequency of a carrier wave is set so that the frequency is suitable for reducing the torque ripple of the motor 22 and decreasing a switching loss of the transistors T1 to T6 of the inverter circuit 24.

Figure 4:
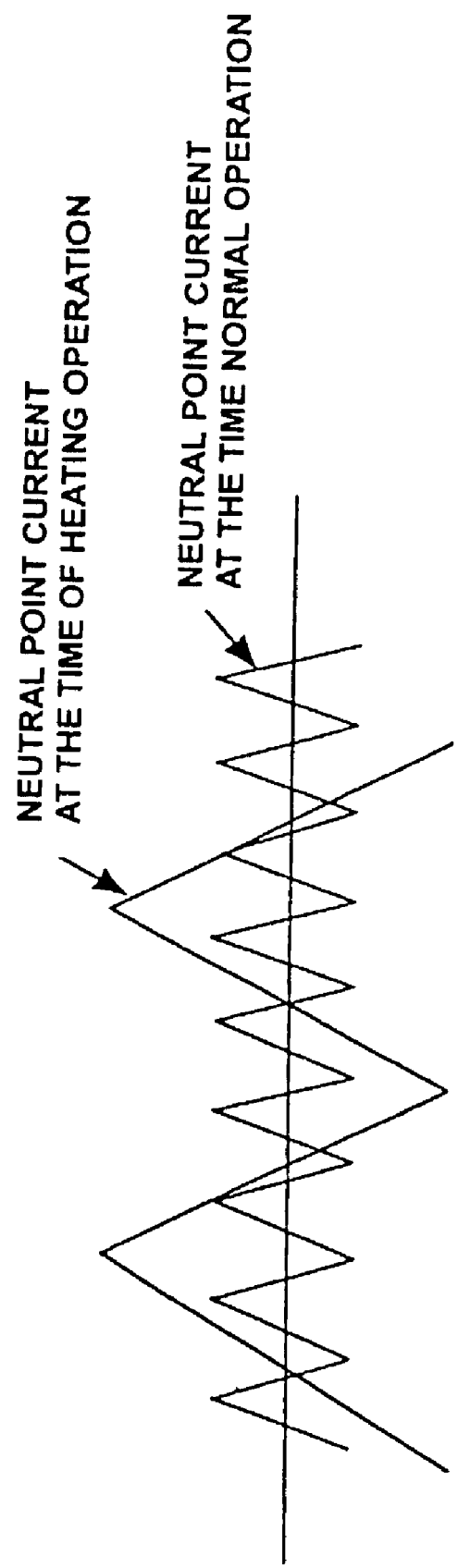
FIG. 4 is an explanatory drawing exemplifying a waveform of a neutral point current during a heating operation.

On the other hand, when it is determined that the power source temperature Tb is the threshold temperature Tblow or less, it is determined that the temperature is too low for the direct-current power source 32 to provide adequate power, and processing of a heating operation for raising the internal temperature of the direct-current power source 32 is begun (Step S106). The processing for the heating operation is, as shown in FIG. 4, processing for making the ripple of a neutral point current flowing to a neutral point of the motor 22 larger than the ripple of a neutral point current generated during normal drive control of the motor 22. Because the direct-current power source 32 is more rapidly heated a larger neutral point current flows into it, its performance is enhanced. More precisely, a voltage between the terminals of the capacitor 30 is set to a value larger than during normal drive control of the motor 22. For example, the voltage between the terminals of the capacitor 30 may be set to a value twice the voltage between the terminals of the direct-current power source 32, and the frequency of the carrier wave is set to a low value. Switching control of the transistors T1 to T6 is then carried out based on this setting. Because the neutral point current which flows to the neutral point of the motor 22 vibrates at the same frequency as that of the carrier wave, when the frequency of the carrier wave is low and the switching frequency of the transistors T1 to T6 therefore becomes low, the neutral point current will generate great vibrations, or, in other words, the ripple of the current will become large. Because an electric potential at the neutral point of the motor 22 instantly changes within a range of the voltage between the terminals of the capacitor 30, when the voltage between the terminals of the capacitor 30 is set to be large, a ripple of the neutral point current will become large. Thus, it is possible to rapidly heat, while driving the motor 22, the direct-current power source 32 up to a temperature which enables the direct-current power source to provide adequate power.

In the power plant 20 according to the first embodiment described above, when a temperature of the direct-current power source 32 is low, the frequency of the carrier wave is set to be low and the voltage between the terminals of the capacitor 30 is set to be high, and switching control of the transistors T1 to T6 is carried out based on the set values. Thus, it is possible to send a current whose ripple is relatively large to the direct-current power source 32 and thereby rapidly heat up the direct-current power source 32 when its temperature is low. As a result, the direct-current power source 32 can perform to its full capacity.

Figure 5:
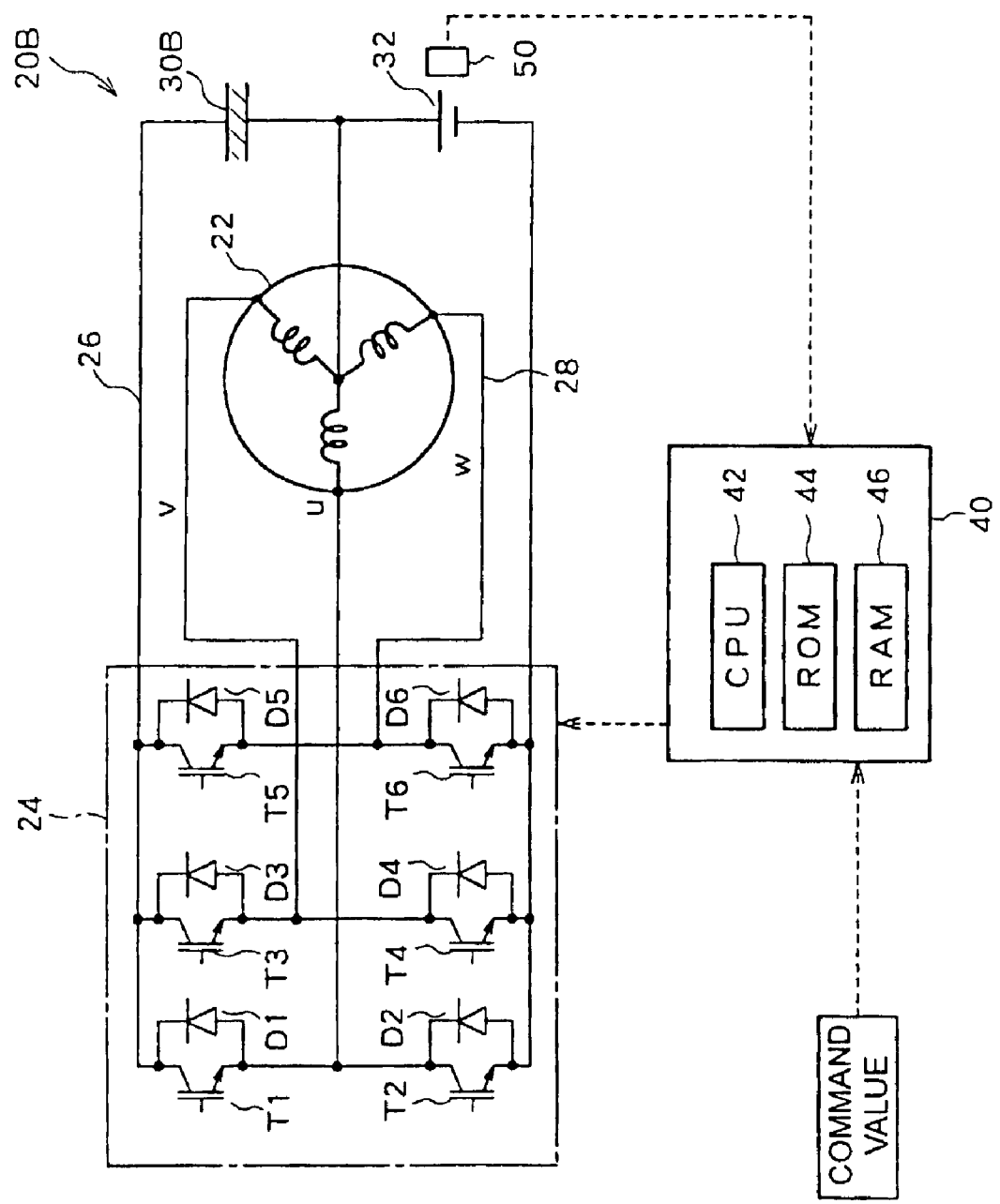
FIG. 5 is a block diagram showing an outline of constitutionof a power plant 20B according to an alternative example.

In the power plant 20 according to the first embodiment, the capacitor 30 is installed in such a manner that the positive electrode bus 26 and the negative electrode bus 28 of the inverter circuit 24 are connected. However, in a power plant 20B, an additional example shown in FIG. 5, it is also possible to install a capacitor 30B in such a manner that the positive electrode bus 26 of the inverter circuit 24 is connected with the neutral point of the motor 22. In this example power plant 20B, the constitution can be considered to be the same in that a direct-current power source whose voltage is the sum of the voltage between the terminals of the capacitor 30B and the voltage between the terminals of the direct-current power source 32 is installed so as to connect the positive electrode bus 26 and the negative electrode bus 28 of the inverter circuit. In other words, the capacitor 30 of the power plant 20 according to the first embodiment is installed so as to connect the positive electrode bus 26 and the negative electrode bus 28 of the inverter circuit 24. Hereinafter, operation concerning the setting of the voltage between the terminals of the capacitor 30B will be described.

Figure 6:
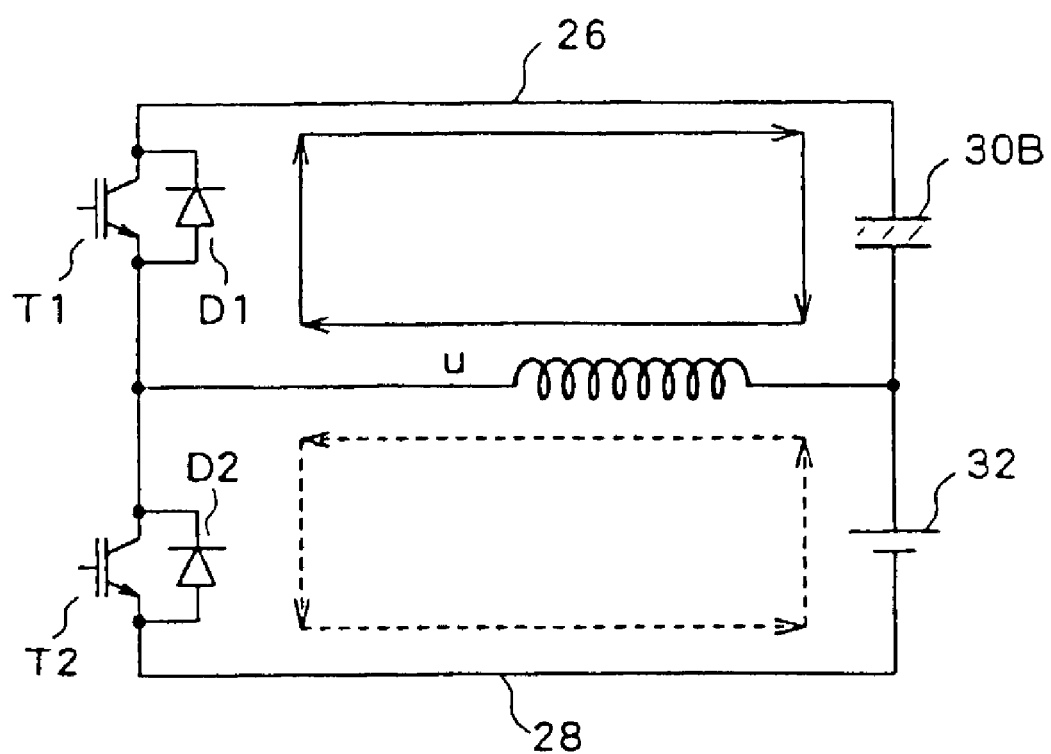
FIG. 6 is a circuit diagram of the alternative example power plant 20B and the diagram shows a u phase of the three-phase coils of the motor 22.

FIG. 6 is a circuit diagram of the power plant 20B which is a deformed example and at the diagram shows the u phase of the three-phase coils of the motor 22. When the transistor T2 is turned on, the short circuit shown by a broken line arrow in the drawing is formed and the u phase of the three-phase coils of the motor 22 functions as a reactor. When the transistor T2 is turned off in this state, energy accumulated in the u phase of the three-phase coils which functions as a reactor is accumulated in the capacitor 30B via the circuit shown by a continuous line arrow in the drawing. On the other hand, by turning off the transistor T1, the direct-current power source 32 can be charged using electric charge from the capacitor 30B. Therefore, this circuit can be considered to be a chopper circuit which is capable of accumulating energy of the direct-current power source 32 in the capacitor 30B and also of charging the direct-current power source 32 using the electric potential of the capacitor 30B. Because the v and w phases of the motor 22 can similarly be considered a chopper circuits similar to the u phase, it is possible to charge the capacitor 30B by turning on or off the transistors T1 to T6 and charge the direct-current power source 32 using electric charges which are accumulated in the capacitor 30B. A potential difference which arises resulting from charging of the capacitor 30B varies according to the quantity of electric charges accumulated in the capacitor 30B, namely, values of currents to be sent to the reactor. Thus, it is possible to control the voltage between the terminals of the capacitor 30B by performing switching control of the transistors T1 to T6 of the inverter circuit 24 and controlling the values of currents to be sent to the reactor. To drive the motor 22 using circuits as described, it is merely necessary to supply a pseudo three-phase alternating current to the three-phase coils of the motor 22 by performing switching control of the transistors T1 to T6 of the inverter circuit 24. If direct current components are added to the three-phase alternating current at this time, in other words, if an electric potential of the three-phase alternating current is offset to the plus side or the minus side and the three-phase alternating current is supplied to the motor 22, the motor 22 can be driven using alternating current components while the capacitor 30B is charged using direct current components. Therefore, it is possible to drive the motor 22 while the voltage between the terminals of the capacitor 30 is adjusted by switching control of the transistors T1 to T6 of the inverter circuit 24. Thus, even in the alternate example power plant 20B, it is possible to set the voltage between the terminals of the capacitor 30B similarly to the power plant 20 according to the first embodiment and execute a temperature rise control processing routine shown in FIG. 3. Here it should be noted that in normal driving of the motor 22, the voltage between the terminals of the capacitor 30B is adjusted to be, for example, almost the same as the voltage between the terminals of the direct-current power source 32, and when the direct-current power source 32 has a low temperature, the voltage between the terminals of the capacitor 30B is set to be higher than the voltage between the terminals of the direct-current power source 32.

In the power plant 20 according to the first embodiment, the direct-current power source 32 is installed in such a manner that the negative electrode bus 28 of the inverter circuit 24 is connected with the neutral point of the motor 22. However, it is also possible to install the direct-current power source 32 in such a manner that the positive electrode bus 26 of the inverter circuit 24 is connected with the neutral point of the motor 22. Further, in the power plant 20B which is an alternate example, the direct-current power source 32 is installed in such a manner that the negative electrode bus 28 of the inverter circuit 24 is connected with the neutral point of the motor 22 and the capacitor 30B is installed in such a manner that the positive electrode bus 26 of the inverter circuit 24 is connected with the neutral point of the motor 22. However, it is also possible to install the capacitor 30B in such a manner that the negative electrode bus 28 of the inverter circuit 24 is connected with the neutral point of the motor 22 and also to install the direct-current power source 32 in such a manner that the positive electrode bus 26 of the inverter circuit 24 is connected with the neutral point of the motor 22.

In the power plant 20 according to the first embodiment and the power plant 20B which is the deformed example, a frequency of a carrier wave is set to be low so as to heat the direct-current power source 32 while the voltage between the terminals of the capacitor 30 is set to be high so as to carry out switching control of the transistors T1 to T6, but it is also possible to employ either one of the above. It should also be noted that if the voltages between the terminals of the capacitors 30 and 30B are not set to be high, it will be possible to install a direct-current power source which can be charged, such as a secondary battery of nickel metal hydride type or lithium ion type, instead of the capacitors 30 and 30B.

In the power plant 20 according to the first embodiment and the power plant 20B according to the alternate example, it is arranged such that the direct-current power source 32 is heated by switching control of the transistors T1 to T6. However, it is also possible to adopt other methods such as, for example, direct heating of a direct-current power source using a heater or the like.

The power plant 20 according to the first embodiment and the power plant 20B of the alternate example is configured such that when the power source temperature Tb of the direct-current power source 32 is the threshold Tblow or below, heating operation for heating the direct-current power source 32 is carried out. However, it is possible to configure the invention such that when the power source temperature Tb of the direct-current power source 32 is a threshold Tbhi or above, temperature rise restraint operation to restrain a temperature rise of the direct-current power source 32 is carried out. Processing of the temperature rise restraint operation is a reverse processing of the heating operation processing at Step S106 of a routine shown in FIG. 3, in other words, a process of making the ripple of the neutral point current smaller than a ripple of the neutral point current which arises resulting from a normal operation processing at Step S104 of the routine shown in FIG. 3. When the neutral point current whose ripple becomes small flows into the direct-current power source 32, it is possible to control a calorific value which arises due to internal resistance of the direct-current power source 32. Also, the direct-current power source 32 can fully demonstrate the performance because the temperature rise is restrained. More specifically, the voltage between the terminals of the capacitor 30 is set to be lower than a voltage between the terminals to be required at the time of normal operation (for example, lower than a voltage which is twice as high as the voltage between the terminals of the direct-current power source 32), while the frequency of the carrier wave is set to be higher than the frequency at the time of normal operation. Based on the setting, switching control of the transistors T1 to T6 is carried out. Here, it is obvious that with regard to the processing of temperature rise restraint operation, either of the setting of the voltage between the terminals of the capacitor 30 and the setting of the frequency of the carrier wave may be put into practice.

Figure 7:
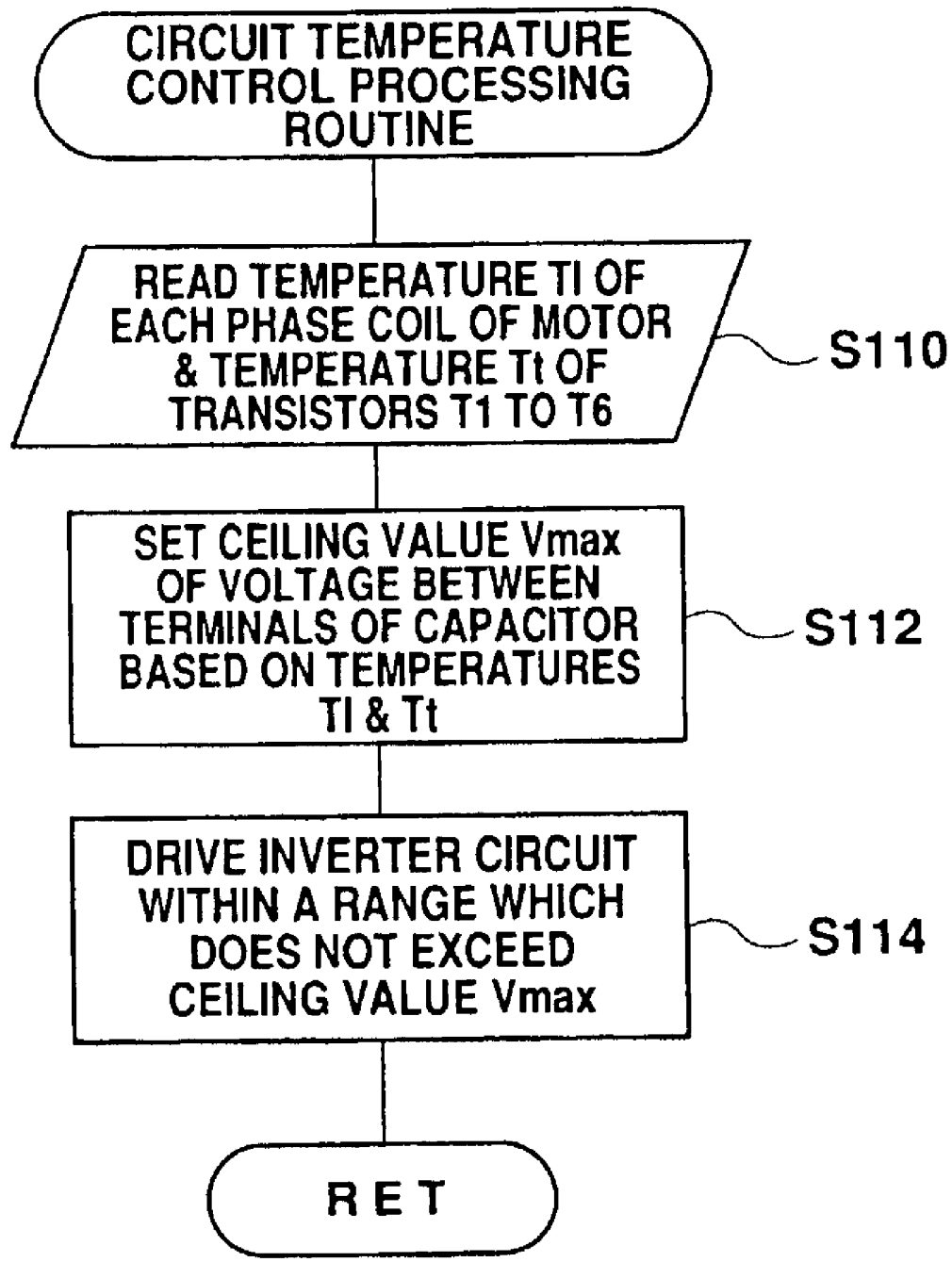
FIG. 7 is a flowchart exemplifying a circuit temperature control processing routine to be executed by the electronic control unit 40.

In the power plant 20 according to the first embodiment, the power plant 20B, and the various example of these devices, it is arranged such that, according to the power source temperature Tb of the direct-current power source 32, a process of heating the direct-current power source 32 and a process of restraining the temperature rise are carried out. However, switching control of the transistors T1 to T6 of the inverter circuit 24 may also be based on a temperature of the step-up and step-down chopper circuit which is composed of a coil of each phase of the motor 22 functioning as a step-up and step-down reactor and the transistors T1 to T6 of the inverter circuit 24 functioning as a switch for set-up and set-down chopping, for example according to the temperature of the coil of each phase of the motor 22 and the temperatures of the transistors T1 to T6. FIG. 7 is a flowchart exemplifying a circuit temperature control processing routine to be executed by the electronic control unit 40. The routine is repeatedly executed at a prescribed interval.

Figure 8:
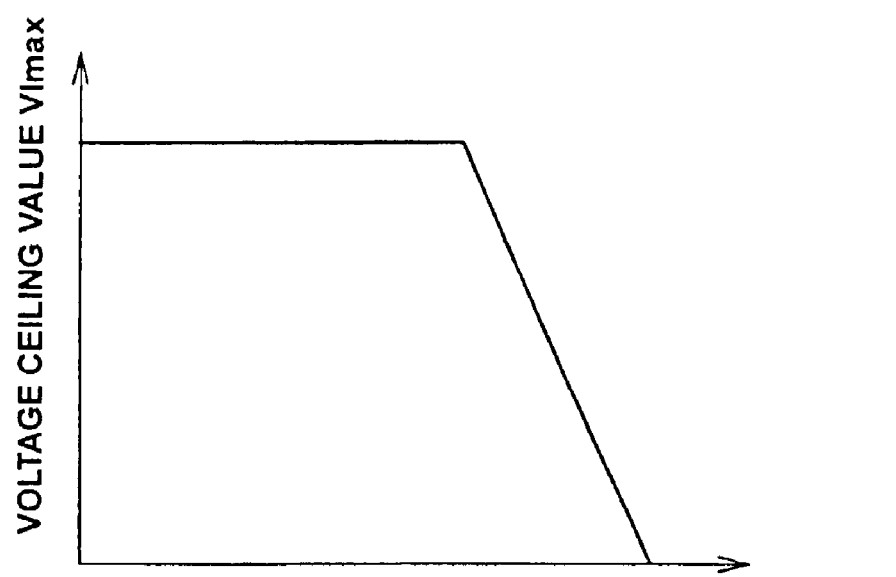
FIG. 8 shows a relationship between a reactor temperature Tl and a voltage ceiling value Vlmax and a relationship between a transistor temperature Tt and a voltage ceiling value Vtmax.
Figure 8:
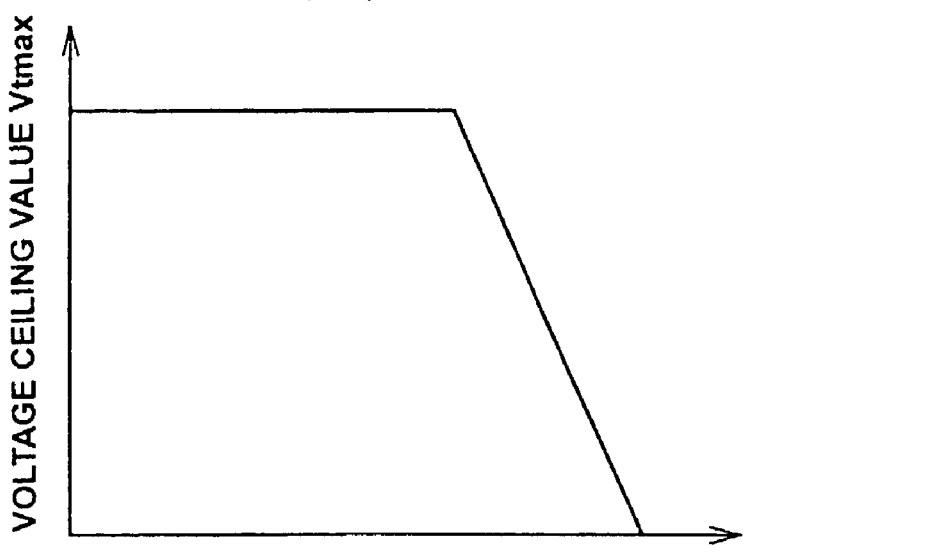

When the circuit temperature control processing routine is executed, the CPU 42 of the electronic control unit 40 first reads a temperature (reactor temperature T1) of the coil of each phase of the motor 22 detected by a temperature sensor 52 and temperatures (transistor temperature Tt) of the transistors T1 to T6 of the inverter circuit 24 detected by a temperature sensor 54 (Step S110). Based on the reactor temperature T1 and the read out transistor temperature Tt, a ceiling value Vmax of the voltage between the terminals of the capacitor 30 is set (Step S112) and switching control of the transistors T1 to T6 of the inverter circuit 24 is performed within a range in which the voltage between the terminals of the capacitor 30 does not exceed the ceiling value Vmax set (Step S114), which ends the routine. For setting of the ceiling value Vmax of the voltage between the terminals of the capacitor 30 in the embodiment, a relationship between the reactor temperature T1 and a ceiling value Vlmax of the voltage between the terminals of the capacitor 30 and a relationship between the transistor temperature Tt and the ceiling value Vlmax of the voltage between the terminals of the capacitor 30 are found through experiment or the like, and stored in the POM 44 as maps. When the reactor temperature T1 and the transistor temperature Tt are given, the ceiling value Vlmax and the Vtmax corresponding to the maps are obtained, and a smaller value among these values is obtained as the ceiling value Vmax of the voltage between the terminals of the capacitor 30. The voltage between the terminals of the capacitor 30 is set to be lower than normal for the purposes of restraining a ripple of a current to be applied to the coil of each phase of the motor 22 and also restraining calorific values which arise due to switching of the transistors T1 to T6 of the inverter circuit 24. FIG. 8 shows maps of the relationship between the reactor temperature T1 and the ceiling value Vlmax of the voltage between the terminals of the capacitor 30 and the relationship between the transistor temperature Tt and the ceiling value Vtmax of the voltage between the terminals of the capacitor 30. By thus imposing restrictions on the voltage between the terminals of the capacitor 30 according to the temperature of the coil of each phase of the motor 22 and the temperatures of the transistors T1 to T6 of the inverter circuit 24, it is possible to protect the coil of each phase of the motor 22 and the transistors T1 to T6 from overheating, and thereby secure stable operation. Although the alternate example is configured such that the ceiling value Vmax of the voltage between the terminals of the capacitor 30 is set based on the reactor temperature T1 of the coil of each phase of the motor 22 and the transistor temperature Tt of the transistors T1 to T6, it is also possible to employ an arrangement wherein the ceiling value Vmax of the voltage between the terminals of the capacitor 30 is set based on either the reactor temperature T1 or the transistor temperature Tt.

Figure 9:
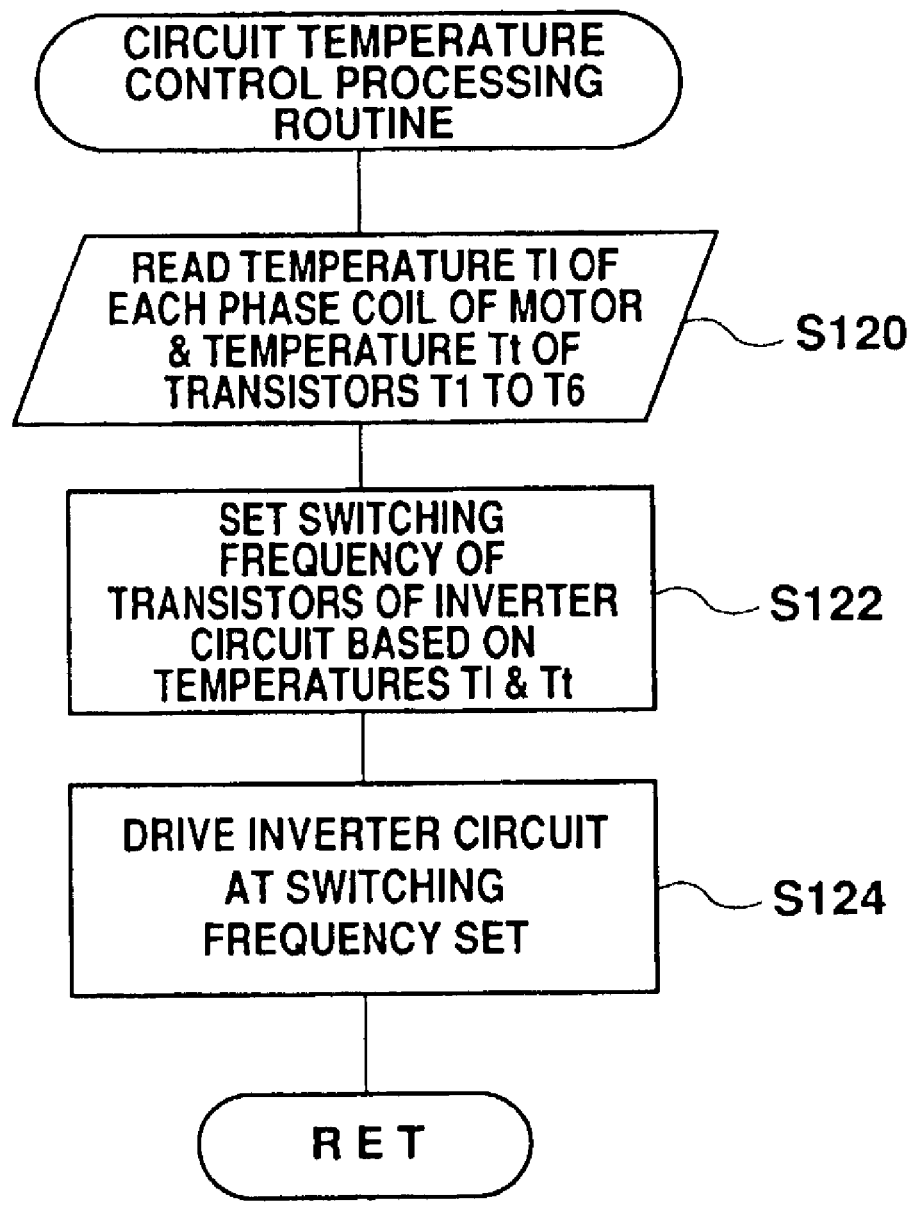
FIG. 9 is a flowchart of an example circuit temperature control processing routine to be executed by the electronic control unit 40.
Figure 10:
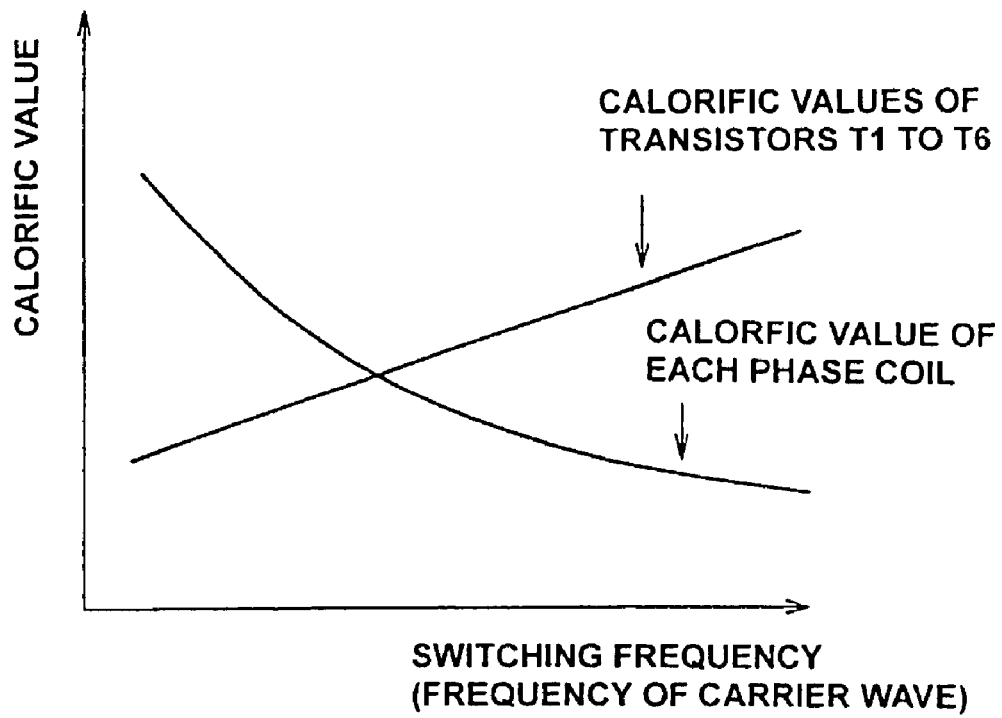
FIG. 10 shows a relationship between calorific values of transistors T1 to T6 and coils of the motor 22 and a switching frequency.

In the alternate example described above, the coil of each phase of the motor 22 and the transistors T1 to T6 are protected from overheating by restricting the voltage between the terminals of the capacitor 30. However, the coil of each phase of the motor 22 and the transistors T1 to T6 can also be protected from overheating by controlling a switching frequency of the transistors T1 to T6. FIG. 9 is a flowchart exemplifying a circuit temperature control processing routine to be executed by the electronic control unit 40. When the circuit temperature control processing routine is executed, the CPU 42 of the electronic control unit 40 first reads the reactor temperature T1 and the transistor temperature Tt detected by the temperature sensor 52 and a temperature sensor 54 (Step S120), and the switching frequency (frequency of a carrier wave) of the transistors T1 to T6 are set based on the reactor temperature T1 and the read out transistor temperature Tt (Step S122). Switching control of the transistors T1 to T6 is then carried out at the set switching frequency (Step S124). Here, with regard to the processing of setting the switching frequency of the transistors T1 to T6 in this example, when the reactor temperature T1 meets or exceeds a threshold temperature T1hi, the switching frequency is set to be, for example, higher than the switching frequency which is set at the time of normal operation at Step S104 of the routine of FIG. 3. Similarly, when the transistor temperature Tt exceeds a threshold temperature Tthi, the switching frequency is set to be lower than the switching frequency which is set at the time of normal operation. FIG. 10 shows a relationship between the switching frequency and a calorific value of the coil of each phase of the motor 22 and calorific values of the transistors T1 to T6. As shown in FIG. 10, the as the switching frequency increases, the calorific value of the coil of each phase decreases. Meanwhile, as the switching frequency decreases, the calorific values of the transistors T1 to T6 decrease. Therefore, when the coil of each phase of the motor 22 which functions as a reactor is overheated due to, for example, a breakdown of a cooling system, the switching frequency is heightened, and when the transistors T1 to T6 are overheated, the switching frequency is lowered, whereby it is possible to protect a part which functions as a step-up and step-down chopper circuit from overheating and secure the stable operation.

In such a power plant 20 according to the first embodiment and the alternate example, it is also possible for a storage such as a CD-ROM, a DVD-ROM, a floppy disc, or the like to be used as a storage medium which stores a computer readable program for causing a computer to function as a control system for performing temperature control processing of the direct-current power source 32 and temperature control processing of the coil of each phase of the motor 22 and the transistors T1 to T6. Effects of the present invention can be achieved by installing the program according to the embodiment of the present invention into an electronic control system and executing the program using such a storage medium.

SECOND EMBODIMENT

Figure 11:
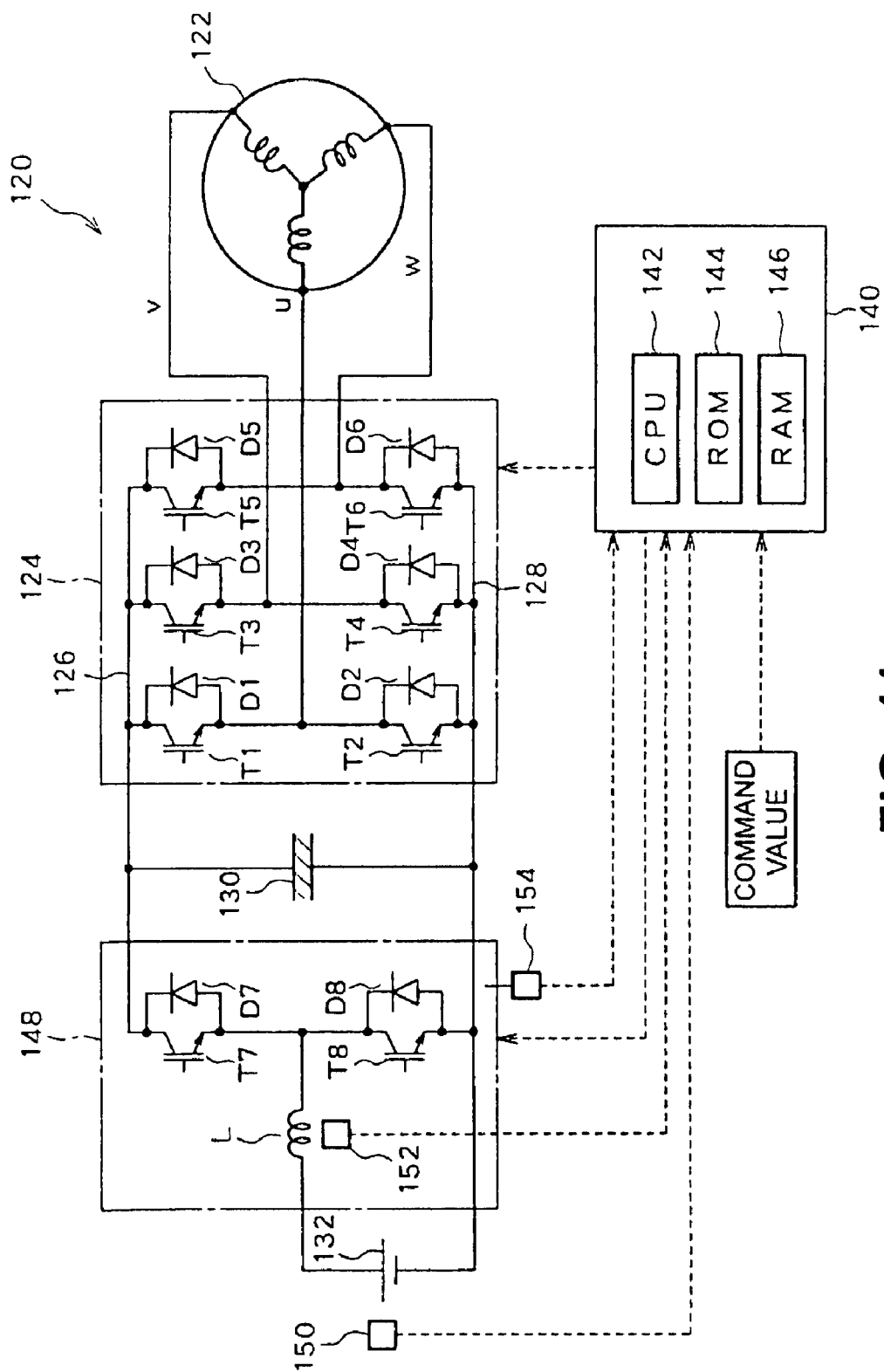
FIG. 11 is a block diagram showing an outline of the constitution of a power plant 120 according to a second embodiment of the present invention.

Next, a power plant 120 according to a second embodiment of the present invention will be described. FIG. 1 is a block diagram showing an outline of the constitution of the power plant 120 according to the second embodiment. As shown in FIG. 11, the power plant 120 according to the second embodiment has the same constitution as that of the power plant 20 according to the first embodiment except that a DC—DC converter 148 which carries out step-up and step-down operation is provided instead of causing the coil of each phase of the motor 22 and the transistors T1 to T6 and the diodes D1 to D6 of the inverter circuit 24 in the power plant 20 according to the first embodiment to function as the step-up and step-down chopper circuit. More specifically, the power plant 120 according to the second embodiment comprises a motor 122 which drives by a three-phase alternating current; an inverter circuit 124 which is capable of converting a electric current power into three-phase alternating current power and supplying the power to the motor 122; a capacitor 130 which is connected with a positive electrode bus 126 and a negative electrode bus 128 of the inverter circuit 124; a direct-current power source 132 which can charge and discharge; a DC—DC converter 148 which is capable of boosting a direct-current voltage from the direct-current power source 132 and supplying the direct-current voltage to the capacitor 130; a temperature sensor 150 which detects a temperature of the direct-current power source 132; and an electronic control unit 140 which controls the entire device. Among the components of the power plant 120 according to the second embodiment, the components corresponding to those of the power plant 20 according to the first embodiment are designated by reference numerals increased by 100 over the reference numerals used for the first embodiment, and the detailed description will not be repeated.

The DC—DC converter 148 comprises two transistors T7 and T8 configured in such a manner that these transistors become a source side and a sink side toward the positive electrode bus 126 and the negative electrode bus 128 of the inverter circuit 124; two diodes D 7 and D8 which are connected with the transistors T7 and T8, respectively, in such a manner that the diodes and the transistors are parallel to each other and the direction of current flow of the former is opposite to that of the latter; and a reactor L which is connected with a node M of the transistors T7 and T8. Further, the electronic control unit 140 outputs a control signal to be used for performing switching control of the transistors T7 and T8 of the DC—DC converter 148.

Figure 12:
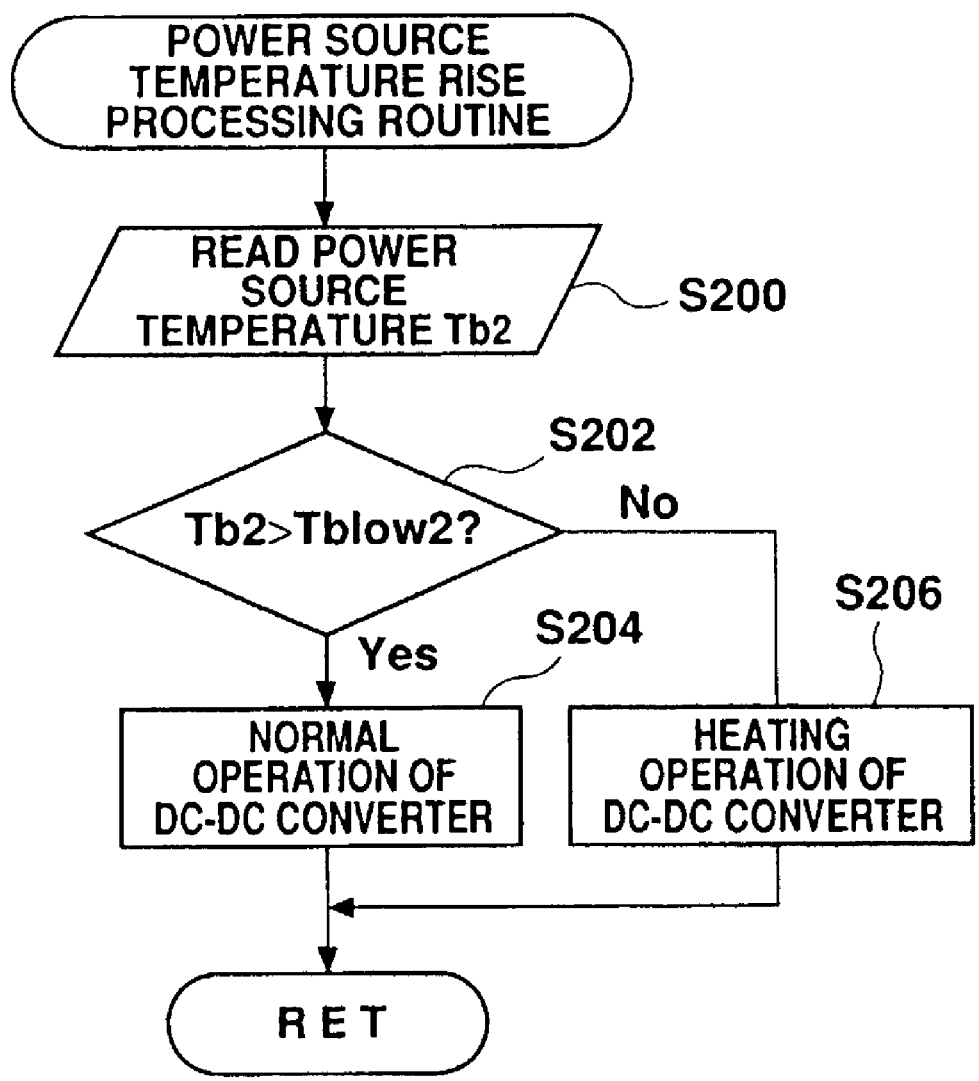
FIG. 12 is a flowchart exemplifying a power temperature rise processing routine to be executed by an electronic control unit 140 of the power plant 120 according to the second embodiment of the present invention.

Operation of the power plant 120 according to the second embodiment constituted in such a manner, particularly operation of heating the direct-current power source 132 when the direct-current power source 132 has a low temperature will be described. FIG. 12 is a flowchart exemplifying a power source temperature rise processing routine to be executed by the electronic control unit 140 of the power plant 120 according to the second embodiment. This routine is repeatedly executed at each prescribed interval.

When the power source temperature rise processing routine is executed, a CPU 142 of the electronic control unit 140 first reads a battery temperature Tb2 of the direct-current power source 132 (Step S200) and determines whether or not the detected power source temperature Tb2 exceeds a threshold temperature Tblow2 (Step S202). As a result of the determination, when the power source temperature Tb exceeds the threshold Tblow2, it is determined that the direct-current power source 132 can supply adequate power to the motor 122, and drive control (processing of normal operation) of the DC—DC converter 148 is carried out using the voltage between the terminals of the capacitor 130 and the switching frequency of the transistors T7 and T8 which are set at the time of normal driving of the motor 122 (Step S204). When the power source temperature Tb is at or below the threshold temperature Tblow2, it is determined that the direct-current power source 132 cannot supply adequate power to the motor 122 because the temperature of the direct-current power source is too low, and a processing of heating operation to heat the direct-current power source 132 is carried out (Step S206), which completes this routine. The processing of heating operation is a process of making a ripple of the current which flows the reactor L larger than a ripple which arises resulting during normal operation at Step S204. When the enlarged ripple of the current flows into the direct-current power source 132, calorification due to the internal resistance of the direct-current power source 132 is promoted and the direct-current power source 132 can rapidly be heated, whereby the performance can fully be demonstrated. To be concrete, the voltage between the terminals of the capacitor 130 is set to be higher than the voltage between the terminals of the capacitor 130 required at the time of normal driving of the motor 122 and also a switching frequency (frequency of a carrier wave) of the transistors T7 and T8 of the DC—DC converter 148 is set to be lower than normal. The processing is carried out by drive control of the DC—DC converter 148 based on this setting, based on the property that, when the electric potential of the node M of the transistors T7 and T8 changes within a range of the voltage between the terminals of the capacitor 130 and at the same frequency as the switching frequency of the transistors T7 and T8, the voltage between the terminals of the capacitor 130 increases, and the switching frequency of the transistors T7 and T8 is lowered, the ripple of the current flowing through the direct-current power source 132 increases.

In the power plant 120 according to the second embodiment described above, when the direct-current power source 132 has a low temperature, the voltage between the terminals of the capacitor 130 is set to be higher than the voltage during normal operation and also the switching frequency (frequency of a carrier wave) of the transistors T7 and T8 is set to a lowered value. Drive control of the DC—DC converter 148 is performed using this setting such that it becomes possible to provide the direct-current power source 132 with a current whose ripple is relatively large and to rapidly heat the direct-current power source 132. Therefore, it is possible to achieve effects similar to those of the power plant according to the first embodiment.

The power plant 120 according to the second embodiment is configured such that the power source temperature Tb2 of the direct-current power source 132 is the threshold Tblow2 or below, heating operation for heating the direct-current power source 132 is carried out. However, it is also possible to employ an arrangement such that when the power source temperature Tb of the direct-current power source 132 is at or above the threshold temperature Tbhi2, a temperature rise restraint operation for restraining a temperature rise of the direct-current power source 132 is employed so as to prevent degradation of the performance of the direct-current power source 132 by excessively high temperatures. The processing of the temperature rise restraint operation is the reverse of the processing of heating operation at Step S206 of the routine shown in FIG. 12, namely, a process of making a ripple of a current which flows the direct-current power source 132 smaller than a ripple of current which arises due to a processing of normal operation at Step 204 of the routine shown in FIG. 12. If the current whose ripple has become small flows into the direct-current power source 132, it will be possible to restrain the calorific value which arises due to internal resistance of the direct-current power source 132, whereby the temperature rise can be restrained. More specifically, the voltage is set to be lower than the voltage between the terminals of the capacitor 130 during normal drive control (during normal operation) of the motor 122 and the switching frequency (frequency of a carrier wave) of the transistors T7 and T8 is set to a higher frequency, and switching control of the transistors T7 and T8 of the DC—DC converter 148 is based on this setting. Here, it is obvious that in a processing of the temperature rise restraint operation, either of the setting of the voltage between the terminals of the capacitor 130 and the setting of the frequency of the carrier wave may be executed.

Figure 13:
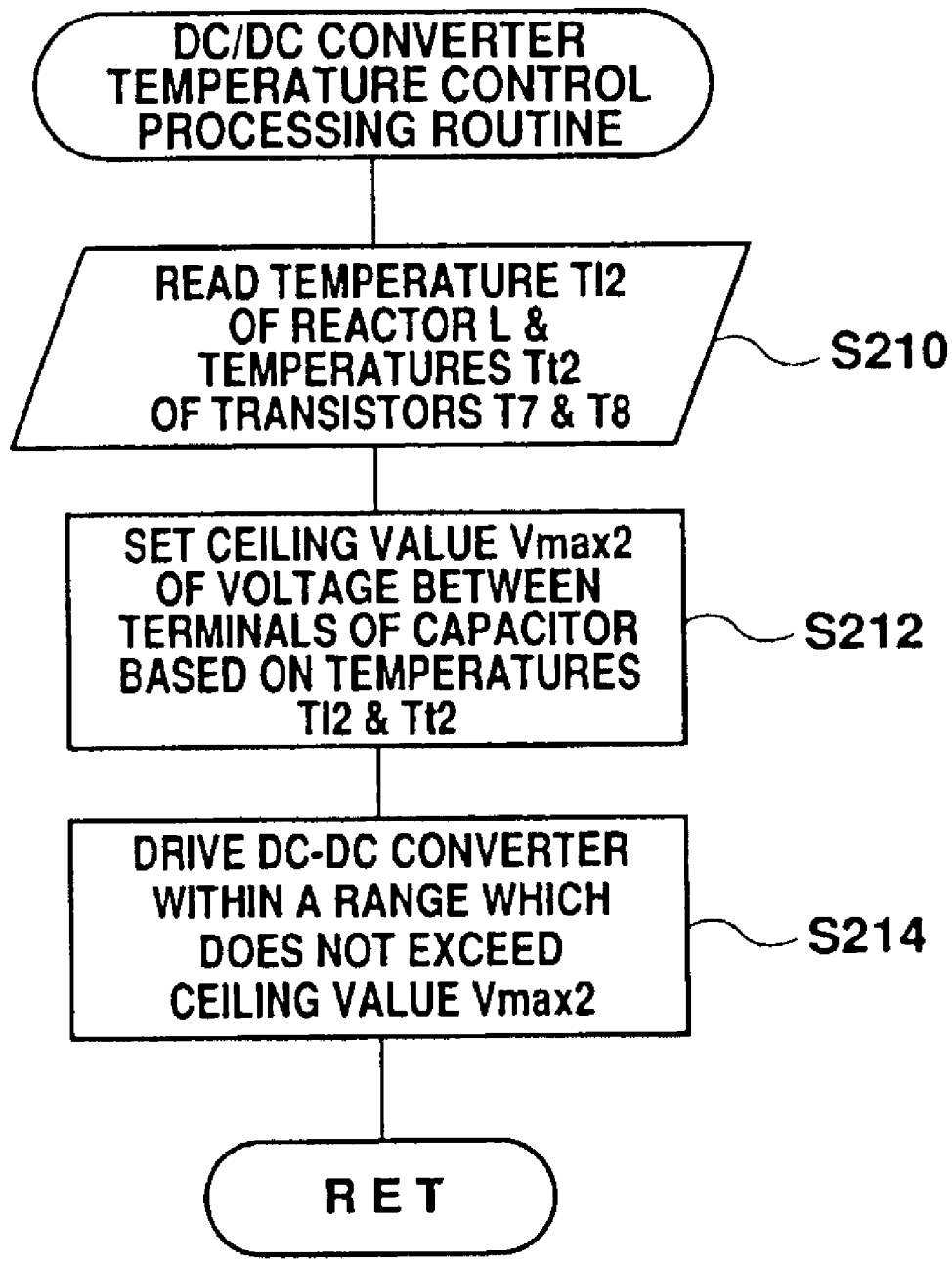
FIG. 13 is a flow chart exemplifying a DC—DC converter temperature control processing routine to be executed by the electronic control unit 140.

In the power plant 120 according to the second embodiment and the alternate example, a process of heating the direct-current power source 132 and a process of restraining the temperature rise are carried out according to the power source temperature Tb2 of the direct-current power source 132. However, it is also possible to employ an arrangement such that temperature control of the DC—DC converter 148 is performed through switching control of the transistors T7 and T8 according to the temperature of the DC—DC converter 148, for example the temperatures of the reactor L and the transistors T7 and T8. FIG. 13 is a flowchart exemplifying a DC—DC converter temperature control processing routine to be executed by the electronic control unit 140. This routine is repeatedly executed at prescribed intervals.

Figure 14:
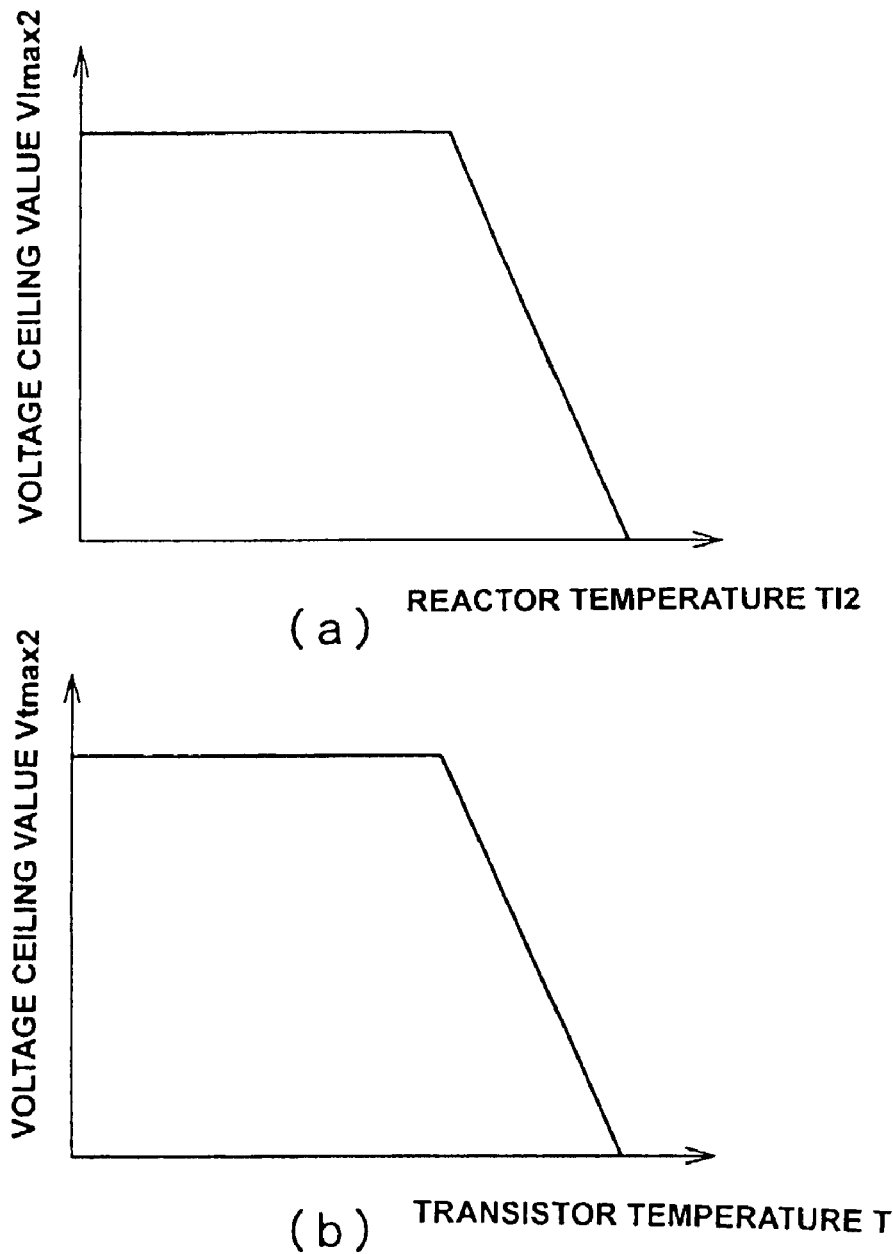
FIG. 14 shows a relationship between a reactor temperature T12 and a voltage ceiling value Vlmax2 and a relationship between a transistor temperature Tt2 and a voltage ceiling value Vtmax2.

When the DC—DC converter temperature control processing routine is executed, the CPU 142 of the electronic control unit 140 first reads the temperature of the reactor L (reactor temperature T12) detected by a temperature sensor 152 and the temperatures of the transistors T7 and T8 (transistor temperature Tt2) detected by a temperature sensor 154 (Step S210). Based on the detected reactor temperature T12 and transistor temperature Tt2, the ceiling value Vmax2 of the voltage between the terminals of the capacitor 130 is then set (Step S212) and switching control of the transistors T7 and T8 of the DC—DC converter 148 is performed within a range which the voltage between the terminals of the capacitor 130 does not exceed the ceiling value Vmax2 set (Step S214), which completes this routine. With regard to setting of the ceiling value Vmax2 of the voltage between the terminals of the capacitor 130 in this embodiment, a relationship between the reactor temperature T12 and the ceiling value Vlmax2 of the voltage between the terminals of the capacitor 130 and a relationship between the transistor temperature Tt2 and the ceiling value Vtmax of the voltage between the terminals of the capacitor 130 are previously found by experiment or the like, and are stored as maps in the ROM 144. When the reactor temperature T12 and the transistor temperature Tt2 are given, the ceiling values Vlmax2 and Vtmax2 corresponding to the maps are obtained, and the smaller value among these values is obtained as the ceiling value Vmax2 of the voltage between the terminals of the capacitor 130. Restrictions are imposed on the voltage between the terminals of the capacitor 130 so as to hold down the ripple of the current which flows into the reactor L to a low level and also restrain calorification which may arise due to switching of the transistors T7 and T8 of the DC—DC converter 148. FIG. 14 shows maps which indicate a relationship between the reactor temperature T12 and the ceiling value Vlmax2 of the voltage between the terminals of the capacitor 130 and a relation between the transistor temperature Tt2 and the ceiling value Vtmax2 of the voltage between the terminals of the capacitor 130. Thus, by imposing restrictions on the voltage between the terminals of the capacitor 130 according to the temperature of the reactor L and the temperatures of the transistors T7 and T8 of the DC—DC converter 148, the DC—DC converter 148 can be protected from overheating and stable operation can be secured. Incidentally, in this alternate example, the invention is configured such that based on the reactor temperature T12 and the transistor temperature Tt2, the ceiling value Vmax2 of the voltage between the terminals of the capacitor 130 is set. However, it is also possible to employ a configuration such that based on either of the reactor temperature T12 and the transistor temperature Tt2, the ceiling value Vmax2 of the voltage between the terminals of the capacitor 130 is set. Further, it is also possible to set the ceiling value Vmax2 of the voltage between the terminals of the capacitor 130 based on the internal temperature of the DC—DC converter 148 excluding the reactor L and the transistors T7 and T8.

Figure 15:
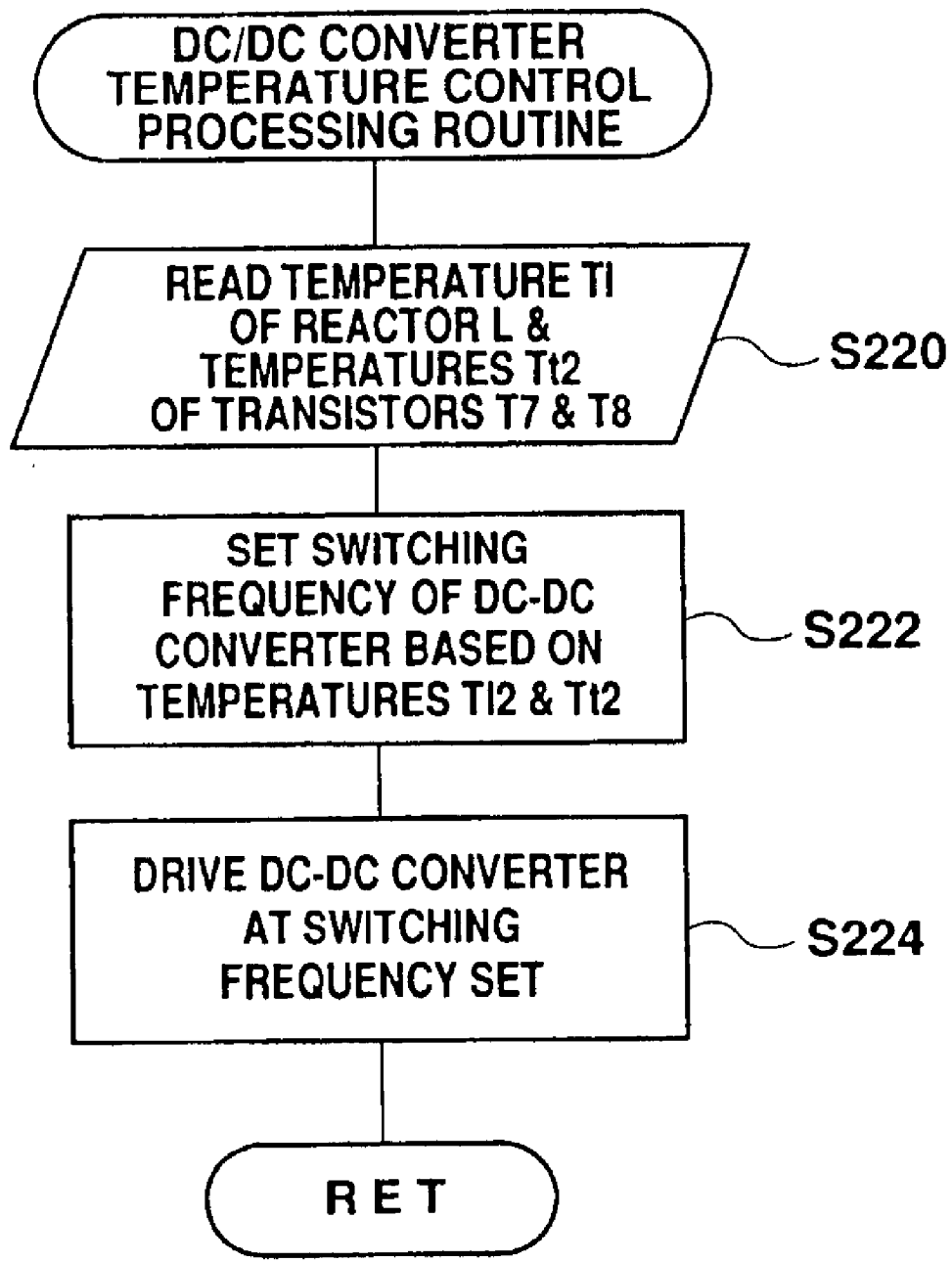
FIG. 15 is a flowchart exemplifying a DC—DC converter temperature control processing routine to be executed by the electronic control unit 140.
Figure 16:
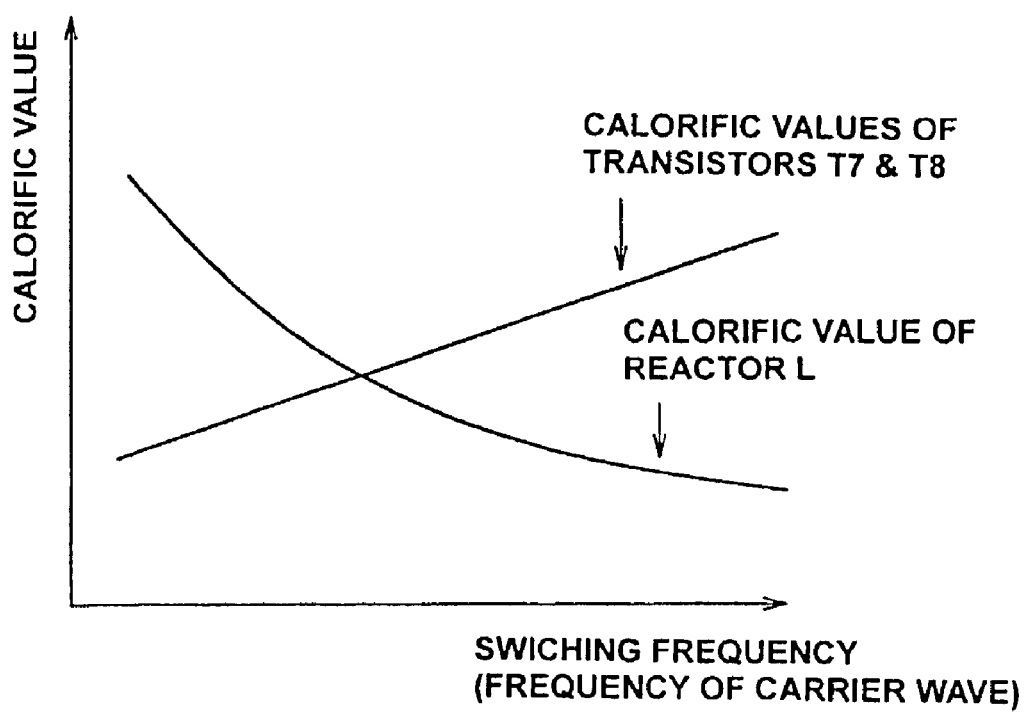
FIG. 16 shows a relationship between calorific values of transistors T7 and T8 and a reactor L and a switching frequency.

In the alternate example described above, is the invention is configured such that the DC—DC converter 148 is protected from overheating by imposing restrictions on the voltage between the terminals of the capacitor 130. However, it is also possible to protect the DC—DC converter 148 from overheating by controlling a switching frequency of the transistors T7 and T8. FIG. 15 is a flowchart exemplifying a DC—DC converter temperature control processing routine to be executed by the electronic control unit 140 in such a case. When the DC—DC converter temperature control processing routine is executed, the CPU 142 of the electronic control unit 140 first reads the reactor temperature T12 and the transistor temperature Tt2 detected by the temperature sensors 152 and 154 (Step S220) and based on the detected reactor temperature T12 and transistor temperature Tt2, a switching frequency (frequency of a carrier wave) of the transistors T7 and T8 is set (Step S222). Switching control of the transistors T7 and T8 of the DC—DC converter 148 is carried out (Step S224) at the set frequency, there by completing this routine. Here, with regard to setting of the switching frequency in this deformed example, when the reactor temperature T12 becomes the threshold T1hi2 or above, the switching frequency is set to be higher than, for example, the switching frequency to be set at the time of normal operation at Step S204 of the routine shown in FIG. 12, and when the transistor temperature Tt2 becomes the threshold Tthi2 or above, the switching frequency is set to be lower than the switching frequency to be set at the time of normal operation. FIG. 16 shows a relationship between a switching frequency and a calorific value of the reactor L and calorific values of the transistors T7 and T8. As shown in FIG. 16, the greater the switching frequency, the greater the decrease in the calorific value of the reactor L, while as the switching frequency becomes low, the calorific values of the transistors T7 and T8 decrease. Therefore, when the reactor L is overheated, for example, due to a breakdown of a cooling system of the DC—DC converter 148, the switching frequency is increased, and when the transistors T7 and T8 are overheated, the switching frequency is lowered, whereby the DC—DC converter 148 can be protected from overheating and the stable operation can be secured.

The power plant 120 according to the second embodiment and the alternate example is configured such that a temperature of the direct-current power source 132 which serves as a power source for driving the motor 122 is controlled. However, it is also possible to configure the power plant such that it will be applicable to a device which controls a temperature of a direct-current power source serving as a power source for driving an ordinary power consuming load. Further, it is also possible to have an aspect such that a storage media such as, for example, a CD-ROM, a DVD-ROM, a floppy disc, or the like, can be used as a storage medium which stores a computer readable program for causing a computer to function as a control system to carry out a processing of temperature control of the direct-current power source 132 and a processing of temperature control of the DC—DC converter 148 (the reactor L and the transistors T7 and T8). Effects of the present invention can be achieved by installing the program according to the embodiment of the present invention into a control system and executing the program by utilizing such a storage medium.

In the power plants 20 and 120 according to the first and second embodiments and the alternate examples, synchronous generator motors which operate by a three-phase alternating current are used as the motors 22 and 122, but any type of motor which employs a polyphase current may be used.

The embodiments of the present invention are described using the aspects hereinbefore, but the present invention is not restricted to such aspects. The present invention can be reduced to practice in various embodiments which will not deviate from the subject matter of the present invention.

INDUSTRIAL APPLICABILITY

As described above, the power plant according to the present invention, a vehicle which carries the device, a control method, a storage medium, and a program of the power plant, and the drive unit according to the present invention, a vehicle which carries the drive unit, a control method, a storage medium, and a program of the drive unit are suitable for controlling a temperature of the power source which serves as a power source of a motor or other electrical appliances to be loaded as a drive source of a vehicle, such as a car, or controlling a temperature of a power converter which intervenes between the power source and the electrical appliance.

What is claimed is:

1. A drive unit comprising:
   a DC—DC converter which has energy accumulating means capable of temporarily accumulating a DC current as energy and which is capable of performing, by switching elements, DC—DC conversion of an input direct current utilizing the energy accumulated in said energy accumulating means and providing a load with the DC—DC converted voltage;
   a power source capable of supplying DC power to said DC—DC converter; and
   temperature control means for performing, based on a temperature of said power source or a temperature of said DC—DC converter, switching control of said switching elements so as to control said temperature.

2. The drive unit according to claim 1, additionally comprising a electric storage device capable of storing power output from said DC—DC converter, wherein said temperature control means are means for controlling a charged voltage of said electric storage device by switching control based on a temperature of said power source or a temperature of said DC—DC converter.

3. The drive unit according to claim 2, wherein said temperature control means are means for performing switching control such that a charged voltage of said electric storage device is higher than normal when a temperature of said power source is at or below a first threshold temperature.

4. The drive unit according to claim 2, wherein said temperature control means are means for performing switching control such that a charged voltage of said electric storage device is lower than normal when a temperature of said power source is at or above a second threshold temperature.

5. The drive unit according to claim 2, wherein said temperature control means are means for imposing restrictions on a charged voltage of said electric storage device and performing switching control when a temperature of said DC—DC converter is at or above a third threshold temperature.

6. The drive unit according to claim 1, wherein said temperature control means are means for setting a switching frequency of said switching elements based on a temperature of said power source or a temperature of said DC—DC converter and performing switching control at the set switching frequency.

7. The drive unit according to claim 6, wherein said temperature control means are means for setting said switching frequency lower than normal and performing switching control when a temperature of said power source is at or below a fourth threshold temperature.

8. The drive unit according to claim 6, wherein said temperature control means are means for setting said switching frequency higher than normal and performing switching control when a temperature of said power source is at or above a fifth threshold temperature.

9. The drive unit according to claim 6, said temperature control means are means for setting said switching frequency lower than normal and performing switching control when at least a temperature of said switching elements is at or above a sixth threshold temperature.

10. The drive unit according to claim 9, wherein said temperature control means are means for setting a switching frequency of said switching elements higher than normal and performing switching control when a temperature of said energy accumulating means is at or above a seventh threshold temperature.

11. The drive unit according to claim 1, wherein said load is an electric motor which operates by a polyphase current and there is provided an inverter circuit capable of converting into a polyphase electric power a direct current power converted by said DC—DC converter and supplying the polyphase electric power to said electric motor.

12. A vehicle on which is installed the drive unit and the electric motor according to claim 11.

13. A control method of a drive unit, wherein said drive unit comprises:
   a DC—DC converter which has energy accumulating means capable of temporarily accumulating a DC current as energy and which is capable of performing, by switching elements, DC—DC conversion of an input direct-current voltage input utilizing said energy accumulating means and providing a load with the DC—DC converted voltage; and a power source capable of supplying a direct current to said DC—DC converter, and wherein, based on a temperature of said power source or a temperature of said DC—DC converter, switching control of said switching elements is performed so as to control said temperature.

14. The control method of a drive unit according to claim 13, wherein, based on a temperature of said power source or temperatures of said switching elements, a charged voltage of an electric storage device included in the drive unit and capable of storing power output from said DC—DC converter is controlled by switching control.

15. The control method of a drive unit according to claim 13, wherein, based on a temperature of said power source or a temperature of said DC—DC converter, a switching frequency of said switching elements is set and switching control is carried out at said set switching frequency.

16. A storage medium, wherein, in a drive unit comprising:
   a DC—DC converter which has energy accumulating means capable of temporarily accumulating a direct current as energy and is capable of performing, by switching elements, DC—DC conversion of an input direct-current voltage utilizing the energy accumulated in said energy-accumulating means and providing a load with the direct-current voltage converted; and
   a power source capable of supplying direct current power to said DC—DC converter,
   said storage medium stores a computer readable program which causes a computer to function as temperature control means for performing, based on a temperature of said direct-current power source or a temperature of said DC—DC converter, switching control of said switching elements so as to control said temperature.

17. A program, wherein, in a drive unit comprising:
   a DC—DC converter which has energy accumulating means capable of temporarily accumulating a DC current as energy and is capable of performing, by switching elements, DC—DC conversion of an input direct-current voltage input utilizing the energy accumulated in said energy accumulating means and providing a load with the direct-current voltage converted; and
   a power source capable of supplying direct current power to said DC—DC converter, said program causes a computer to function as temperature control means for performing, based on a temperature of said direct-current power source or a temperature of said DC—DC converter, switching control of said switching elements so as to control said temperature.

18. A drive unit comprising:
   a DC—DC converter which has an energy accumulator capable of temporarily accumulating a DC current as energy and which is capable of performing, by switching elements, DC—DC conversion of an input direct current utilizing the energy accumulated in said energy accumulator and providing a load with the DC—DC converted voltage;
   a power source capable of supplying DC power to said DC—DC converter; and
   a temperature control for performing, based on a temperature of said power source or a temperature of said DC—DC converter, switching control of said switching elements so as to control said temperature.

19. The drive unit according to claim 18, additionally comprising an electric storage device capable of storing power output from said DC—DC converter, wherein said temperature control is adapted to control a charged voltage of said electric storage device by switching control based on a temperature of said power source or a temperature of said DC—DC converter.

20. The drive unit according to claim 19, wherein said temperature control is adapted to perform switching control such that a charged voltage of said electric storage device is higher than normal when a temperature of said power source is at or below a first threshold temperature.

21. The drive unit according to claim 19, wherein said temperature control is adapted to perform switching control such that a charged voltage of said electric storage device is lower than normal when a temperature of said power source is at or above a second threshold temperature.

22. The drive unit according to claim 19, wherein said temperature control is adapted to impose restrictions on a charged voltage of said electric storage device and to perform switching control when a temperature of said DC—DC converter is at or above a third threshold temperature.

23. The drive unit according to claim 18, wherein said temperature control is a device adapted to set a switching frequency of said switching elements based on a temperature of said power source or a temperature of said DC—DC converter and to perform switching control at the set switching frequency.

24. The drive unit according to claim 23, wherein said temperature control is a device adapted to set said switching frequency lower than normal and to perform switching control when a temperature of said power source is at or below a fourth threshold temperature.

25. The drive unit according to claim 23, wherein said temperature control is a device adapted to set said switching frequency higher than normal and to perform switching control when a temperature of said power source is at or above a fifth threshold temperature.

26. The drive unit according to claim 23, said temperature is a device adapted to set said switching frequency lower than normal and to perform switching control when at least a temperature of said switching elements is at or above a sixth threshold temperature.

27. The drive unit according to claim 26, wherein said temperature control is a device adapted to set a switching frequency of said switching elements higher than normal and to perform switching control when a temperature of said energy accumulator is at or above a seventh threshold temperature.

28. The drive unit according to claim 18, wherein said load is an electric motor which operates by a polyphase current and there is provided an inverter circuit capable of converting into a polyphase electric power a direct current power converted by said DC—DC converter and supplying the polyphase electric power to said electric motor.

29. A vehicle on which is installed the drive unit and the electric motor according to claim 28.

30. A control method of a drive unit, wherein said drive unit comprises:
   a DC—DC converter which has an energy accumulator capable of temporarily accumulating a DC current as energy and which is capable of performing, by switching elements, DC—DC conversion of an input direct-current voltage input utilizing said energy accumulator and providing a load with the DC—DC converted voltage; and
   a power source capable of supplying a direct current to said DC—DC converter,
   and wherein, based on a temperature of said power source or a temperature of said DC—DC converter, switching control of said switching elements is performed so as to control said temperature.

31. The control method of a drive unit according to claim 30, wherein, based on a temperature of said power source or temperatures of said switching elements, a charged voltage of an electric storage device included in the drive unit and capable of storing power output from said DC—DC converter is controlled by switching control.

32. The control method of a drive unit according to claim 30, wherein, based on a temperature of said power source or a temperature of said DC—DC converter, a switching frequency of said switching elements is set and switching control is carried out at said set switching frequency.

33. A storage medium, wherein, in a drive unit comprising:

a DC—DC converter which has an energy accumulator capable of temporarily accumulating a direct current as energy and is capable of performing, by switching elements, DC—DC conversion of an input direct-current voltage utilizing the energy accumulated in said energy accumulator and providing a load with the direct-current voltage converted; and a power source capable of supplying direct current power to said DC—DC converter, said storage medium stores a computer readable program which causes a computer to function as temperature controller to perform, based on a temperature of said direct-current power source or a temperature of said DC—DC converter, switching control of said switching elements so as to control said temperature.

34. A program, wherein, in a drive unit comprising:

a DC—DC converter which has an energy accumulator capable of temporarily accumulating a DC current as energy and is capable of performing, by switching elements, DC—DC conversion of an input direct-current voltage input utilizing the energy accumulated in said energy accumulator and providing a load with the direct-current voltage converted; and a power source capable of supplying direct current power to said DC—DC converter, said program causes a computer to function as temperature controller to perform, based on a temperature of said direct-current power source or a temperature of said DC—DC converter, switching control of said switching elements so as to control said temperature.

35. A drive unit comprising:

a DC—DC converter which has energy accumulating means capable of temporarily accumulating a DC current as energy and which is capable of performing, by switching elements, DC—DC conversion of an input direct current utilizing the energy accumulated in said energy accumulating means and providing a load with the DC—DC converted voltage;

a power source capable of supplying DC power to said DC—DC converter; and temperature control means for performing, based on a temperature of any element included in said drive unit, switching control of said switching elements so as to control said temperature.

36. A control method of a drive unit, wherein said drive unit comprises:

a DC—DC converter which has energy accumulating means capable of temporarily accumulating a DC current as energy and which is capable of performing, by switching elements, DC—DC conversion of an input direct-current voltage input utilizing said energy accumulating means and providing a load with the DC—DC converted voltage; and a power source capable of supplying a direct current to said DC—DC converter, and wherein, based on a temperature of any element included in said drive unit, switching control of said switching elements is performed so as to control said temperature.

37. A storage medium, wherein, in a drive unit comprising:

a DC—DC converter which has energy accumulating means capable of temporarily accumulating a direct current as energy and is capable of performing, by switching elements, DC—DC conversion of an input direct-current voltage utilizing the energy accumulated in said energy accumulating means and providing a load with the direct-current voltage converted; and a power source capable of supplying direct current power to said DC—DC converter, said storage medium stores a computer readable program which causes a computer to function as temperature control means for performing, based on a temperature of any element included in said drive unit, switching control of said switching elements so as to control said temperature.

38. A program, wherein, in a drive unit comprising:

a DC—DC converter which has energy accumulating means capable of temporarily accumulating a DC current as energy and is capable of performing, by switching elements, DC—DC conversion of an input direct-current voltage input utilizing the energy accumulated in said energy accumulating means and providing a load with the direct-current voltage converted; and a power source capable of supplying direct current power to said DC—DC converter, said program causes a computer to function as temperature control means for performing, based on a temperature of any element included in said drive unit, switching control of said switching elements so as to control said temperature.

* * * * *

UNITED STATES PATENT AND TRADEMARK OFFICE
CERTIFICATE OF CORRECTION

PATENT NO. : 7,120,037 B2
APPLICATION NO. : 10/239889
DATED : October 10, 2006
INVENTOR(S) : Masayuki Komatsu et al.

It is certified that error appears in the above-identified patent and that said Letters Patent is hereby corrected as shown below:

Column 1, line 52, change "power source slowdown then directcurrent." to --power source slows down, then direct current--;

Column 2, line 16, change "directcurrent" to --direct current--;

Column 3, line 39, change "from the either bus," to --from either bus--;

Column 3, line 54, change "strage device" to --storage device--;

Column 5, line 15, change "from the either bus," to --from either bus--;

Column 6, line 15, change "from the either bus," to --from either bus--;

Column 7, line 19, change "from the either bus," to --from either bus--;

Column 7, line 67, change "power plant tooperate to its full potetial" to --power plant to operate to its full potential--;

Column 8, line 12, change "from the either bus," to --from either bus--;

Column 13, line 26, change "considered to be a step-up and" to --considered to be step-up and--;

Column 14, line 39, change "flows into it, its performance" to --flows into it, and its performance--;

Column 15, line 46, change "be considered a choppercircuits" to --be considered chopper circuits--;

Column 17, lines 40-41 change "set-up and set-down chopping," to --step-up and step-down chopping--;

Column 18, line 64, after "Fig. 10," delete "the";

Column 19, line 62, change " D 7" to --D7--;

Column 22, line 25, change "confiruredsuch" to --configured such--;

Column 22, line 36, change "is" to --in--;

UNITED STATES PATENT AND TRADEMARK OFFICE
CERTIFICATE OF CORRECTION

PATENT NO. : 7,120,037 B2
APPLICATION NO. : 10/239889
DATED : October 10, 2006
INVENTOR(S) : Masayuki Komatsu et al.

It is certified that error appears in the above-identified patent and that said Letters Patent is hereby corrected as shown below:

Column 22, line 55, change "there by" to --thereby--;

Signed and Sealed this

Thirteenth Day of November, 2007

JON W. DUDAS
*Director of the United States Patent and Trademark Office*